US012769776B2

(12) United States Patent
Merkur

(10) Patent No.: US 12,769,776 B2
(45) Date of Patent: Oct. 20, 2026

(54) SYSTEM AND METHODS FOR SEARCHING TEXT UTILIZING CATEGORICAL TOUCH INPUTS

(71) Applicant: Michael Merkur, Thornhill (CA)

(72) Inventor: Michael Merkur, Thornhill (CA)

( * ) Notice: Subject to any disclaimer, the term of this patent is extended or adjusted under 35 U.S.C. 154(b) by 285 days.

(21) Appl. No.: 18/417,918

(22) Filed: Jan. 19, 2024

(65) Prior Publication Data

US 2024/0248922 A1 Jul. 25, 2024

Related U.S. Application Data

(60) Provisional application No. 63/439,925, filed on Jan. 19, 2023.

(51) Int. Cl.

| | |
|---|---|
| ***G06F 16/335*** | (2019.01) |
| ***G06F 3/0482*** | (2013.01) |
| ***G06F 3/0484*** | (2022.01) |
| ***G06F 3/0488*** | (2022.01) |
| ***G06F 16/334*** | (2025.01) |
| ***G06F 16/338*** | (2019.01) |
| ***G06F 40/117*** | (2020.01) |

(Continued)

(52) U.S. Cl.

CPC .......... *G06F 16/335* (2019.01); *G06F 3/0482* (2013.01); *G06F 3/0484* (2013.01); *G06F 3/0488* (2013.01); *G06F 16/3343* (2019.01); *G06F 16/338* (2019.01); *G06F 40/117* (2020.01); *G06F 40/177* (2020.01); *G06F 40/253* (2020.01); *G06T 11/10* (2026.01)

(58) Field of Classification Search

CPC .. G06F 40/253; G06F 16/3343; G06F 16/335; G06F 16/338; G06F 40/117; G06F 40/177; G06F 3/0482; G06F 3/0484; G06T 11/10

See application file for complete search history.

(56) References Cited

U.S. PATENT DOCUMENTS

| | | | |
|---|---|---|---|
| 7,047,550 | B1 | 5/2006 | Yasukawa et al. |
| 7,051,022 | B1 | 5/2006 | Chu et al. |

(Continued)

OTHER PUBLICATIONS

International Search Report and Written Opinion of the International Searching Authority in relation to International Application No. PCT/IB2024/000046, dated Jun. 25, 2024, 18 pages.

*Primary Examiner* — Andrea C Leggett

(74) *Attorney, Agent, or Firm* — Bochner PLLC; Andrew D. Bochner

(57) ABSTRACT

A computer implemented method for searching text utilizing categorical touch inputs, the method comprising: obtaining a written work; organizing the written work into one or more stories, the one or more stories comprised of one or more slices; filtering the one or more slices via a user input, the user input comprising at least one of a plurality of clusters and a manual tag; generating a text of the written work, the text of the written work derived from the one or more slices; displaying, via a display, the text of the written work; color-coding the text of the written work creating color-coded text; displaying, via the display, the color-coded text in a table; generating a grid comprised of one or more colors, the grid having an equal number of columns and rows as the table, and the one or more colors corresponding to the color-coded text in the table.

13 Claims, 29 Drawing Sheets

(51) Int. Cl.

| | |
|---|---|
| ***G06F 40/177*** | (2020.01) |
| ***G06F 40/253*** | (2020.01) |
| ***G06T 11/10*** | (2026.01) |

(56) References Cited

U.S. PATENT DOCUMENTS

| | | | | |
|---|---|---|---|---|
| 7,120,861 | B1 | 10/2006 | Marukawa | |
| 7,668,718 | B2 | 2/2010 | Kahn et al. | |
| 9,430,518 | B2 | 8/2016 | Grossman et al. | |
| 11,062,615 | B1 | 7/2021 | Speciner et al. | |
| 2005/0032027 | A1 | 2/2005 | Patton et al. | |
| 2006/0253418 | A1 | 11/2006 | Charnock et al. | |
| 2012/0221687 | A1* | 8/2012 | Hunter | G06F 16/435 709/219 |
| 2018/0113943 | A1* | 4/2018 | Guo | G06F 16/35 |
| 2020/0012686 | A1* | 1/2020 | Lewin-Eytan | G06F 16/90324 |
| 2020/0342016 | A1 | 10/2020 | Morris | |
| 2022/0067991 | A1* | 3/2022 | Raviv | G06T 11/60 |
| 2022/0366892 | A1* | 11/2022 | Finlay | G06F 16/685 |
| 2023/0409298 | A1* | 12/2023 | Ciminelli | G06V 10/945 |

* cited by examiner

700

800

900

FIG. 18
H
1800
H
Berachos
43
6a 1
Demons are Everywhere
44
6a 1
Surrounding Each Person
45
6a 1
Interfering with Daily Life
46
6a 1
Around a Person's Bed
47
6a 1
Demon Magic Powder
48
6a 1
Seal it with an Iron Seal
49
6a 1
Rav Bibi Tries it Out

2000

| KOREAN (6 of 7) FIRST CONSONANTS IN ORDER | NUMBER | SOUND GROUPS | COLOR | NATURE | JAPANESE (6 of 7) WEEKDAYS IN ORDER |
|---|---|---|---|---|---|
| ㄱ K G | 1 | K G J Ch | Yellow | Sun | 日 Sun |
| ㄴ N | 2 | M N | Gray | Moon | 月 Moon |
| ㄷ T D | 3 | T D Th | Red | Fire | 火 Fire |
| ㄹ R L | 4 | R L | Blue | Water | 水 Water |
| | 5 | Y W H Kh | Green | Tree | 木 Tree |
| ㅂ P B | 6 | P B F V | Purple | Flower | |
| ㅅ S | 7 | S Z Sh | Brown | Soil | 土 Soil |

KANDLES --> (derived from SOUNDEX algorithm) A FIXED COLOR SOUND SEQUENCING USED FOR MAPPING ALL WORDS BASED ON FIRST CONSONANTAL SOUND

FIG. 20

2200

Search 4942 of 4942

| Book# | Book | | Page | Letter | | Number | Title | Old Rabb |
|---|---|---|---|---|---|---|---|---|
| 1 | Berachos | | $5b^3$ | A | | 1 | God Cannot Punish Without Justice | |
| 1 | Berachos | | $5b^3$ | A | | 2 | Anyone Heard Anything Make It Known | |
| 1 | Berachos | | $5b^3$ | A | | 3 | Divide A Third For Worker To Take | 29 |
| 1 | Berachos | | $5b^3$ | A | | 4 | Left None Stole All, Not Rightful Share | |
| 1 | Berachos | | $5b^3$ | A | | 5 | Huna Harbored Claim, Cannot Withhold From Worker | 31 |
| 1 | Berachos | | $5b^3$ | A | | 6 | Price Of Vinegar To Price Of Wine | |
| 1 | Berachos | | $6a^1$ | B | | 7 | Eye Could See, No Creature Could Stand | |
| 1 | Berachos | | $6a^1$ | B | | 8 | More Numerous Than Ditch Around A Mound | |
| 1 | Berachos | | $6a^1$ | B | | 9 | Thousand To Left Ten Thousand To Right | |
| 1 | Berachos | | $6a^1$ | B | | 10 | Lurking At Lectures Regarding Festival Laws | 6 |
| 1 | Berachos | | $6a^1$ | B | | 11 | Not Working Yet Wardrobe Wears Out Quickly | 9 |
| 1 | Berachos | | $6a^1$ | B | | 12 | Feet Affected Protect From This Phenomena | 10 |
| 1 | Berachos | | $6a^1$ | B | | 13 | Spread Sifted Ashes Before Sleeping To See | |
| 1 | Berachos | | $6a^1$ | C | | 14 | Go Get A Cat's Placenta To Grind | |
| 1 | Berachos | | $6a^1$ | C | | 15 | Insert A Small Amount Into His Eye | 14 |

FIG. 22

SYSTEM AND METHODS FOR SEARCHING TEXT UTILIZING CATEGORICAL TOUCH INPUTS

FIELD OF DISCLOSURE

The present disclosure is in the field of search systems. More specifically, the present disclosure relates to a system for sorting through various texts utilizing a taxonomical tree structure. The present disclosure exemplifies religious texts; however, any selected texts may be used.

INTRODUCTION

When confronted with substantial volumes of textual information, the utility of an advanced sorting tool becomes apparent for users seeking efficient and precise access to specific sections within the text. A multitude of systems have been developed to reduce the burden associated with parsing through large quantities of textual information, wherein users manually input their search queries, in turn prompting the system to scour the entire corpus for text congruent with the input. These systems are often tailored for specific demographics, be it a particular age group or individuals with a penchant for a specific genre.

Nonetheless, these systems exhibit limitations in terms of portability and accessibility. The reliance on a physical keyboard for input poses a logistical challenge, as not all computerized devices support such input methods-take, for instance, smartwatches. Such an obstacle places a substantial burden upon users desiring seamless access to textual content. Additionally, users navigating these systems must possess a precise understanding of the exact words they seek, which proves challenging in scenarios where users recall the underlying concept or subject matter but not the specific terminology within the text they wish to search.

In light of these challenges, there arises a compelling need for a device featuring pre-programmed buttons capable of facilitating textual search queries. Such a device would empower users to navigate through textual selections effortlessly, circumventing the necessity of a traditional keyboard. Furthermore, it would be further desirable to provide a device that enables text searches in situations where keyboard use is impractical, as exemplified by the constraints posed by smartwatches. It would be yet further desirable to provide a system specifically configured to categorize and sort themes based on phonetic similarities, adding a nuanced and sophisticated dimension to the search process.

SUMMARY

This Summary is provided to introduce a selection of concepts in a simplified form that are further described below in the Detailed Description. This Summary is not intended to identify key features or essential features, nor is it intended to limit the scope of the claims included herewith.

Provided may be a computer implemented method for searching text utilizing categorical touch inputs, the method may comprise: obtaining a written work; organizing the written work into one or more stories, the one or more stories comprised of one or more slices; filtering the one or more slices via a user input, the user input comprising at least one of a plurality of clusters and a manual tag; generating a text of the written work, the text of the written work derived from the one or more slices; displaying, via a display, the text of the written work; color-coding the text of the written work creating color-coded text; displaying, via the display, the color-coded text in a table; generating a grid comprised of one or more colors, the grid having an equal number of columns and rows as the table, and the one or more colors corresponding to the color-coded text in the table.

In an embodiment, color-coding the text of the written work comprises the steps of: determining a phonetic sound at a beginning of one or more words comprising the text of the written work; and assigning a color to the one or more words based on the phonetic sound at the beginning of the one or more words.

In another embodiment, the color assigned to the one or more words is selected from the group consisting of blue, brown, green, grey, purple, red, and yellow.

In a further embodiment, the written work is selected from the group consisting of the Talmud and the Torah.

In an additional embodiment, the plurality of clusters is a theme selected from the group consisting of Culture, Nations, Nature, Religion, NSFW, People, and Spiritual.

In yet a further embodiment, the manual tag is comprised of a custom user input.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

FIG. 20 illustrates an embodiment of an alternate Soundex grouping system.

FIG. 22 illustrates an embodiment of a secondary volume selection.

DETAILED DESCRIPTION

Figure 1:
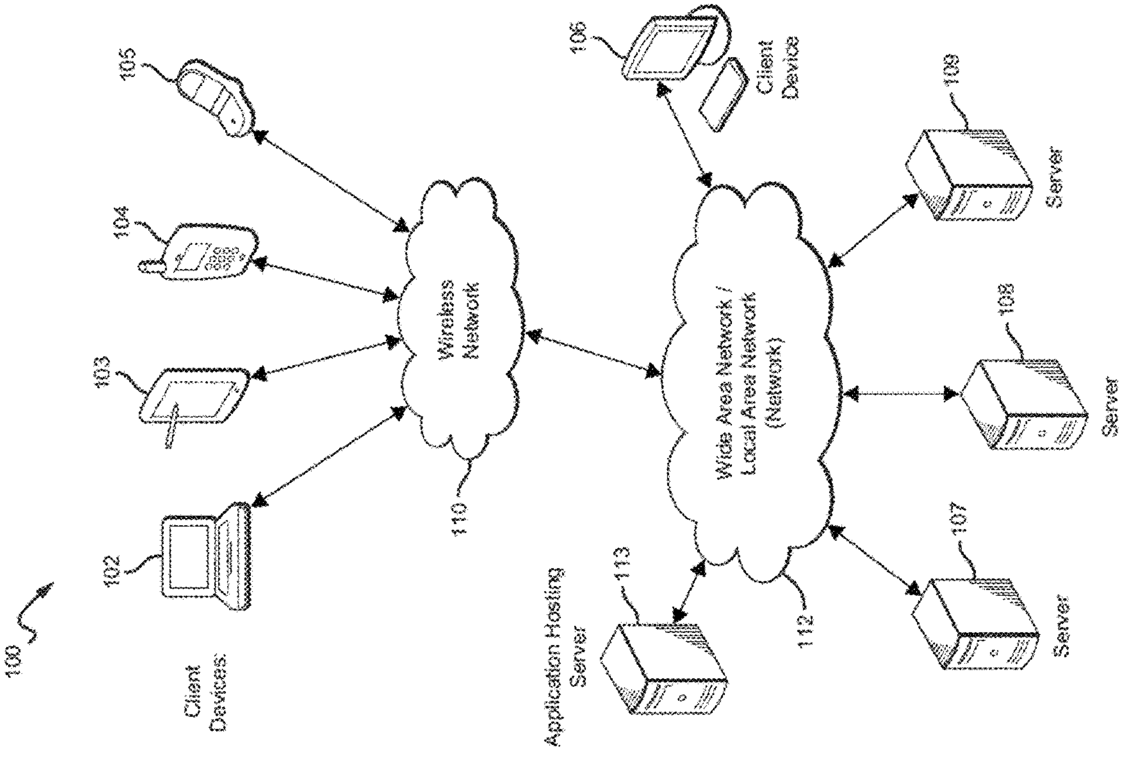
FIG. 1 illustrates an embodiment of an environment in which the present disclosure may be practiced.

Throughout the specification, wherever practicable, like structures will be identified with reference numbers. In some figures, components, such as additional electrical connections or fasteners have been omitted for clarity in the drawings. Unless expressly stated otherwise, the term "or" means "either or both" such that "A or B" includes A alone, B alone, and both A and B together.

Although the present device and system has been described in terms of various embodiments, it is to be understood that such disclosure is not intended to be limiting. Various alterations and modifications will be readily apparent to those of skill in the art. Accordingly, it is intended that the appended claims be interpreted as covering all alterations and modifications and fall within the spirit and scope of the present disclosure.

FIG. 1 illustrates components of one embodiment of an environment in which the present disclosure may be practiced. Not all of the components may be required to practice the present disclosure, and variations in the arrangement and type of the components may be made without departing from the spirit or scope of the present disclosure. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. The client devices 102-106 may include, for example, at least one of desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
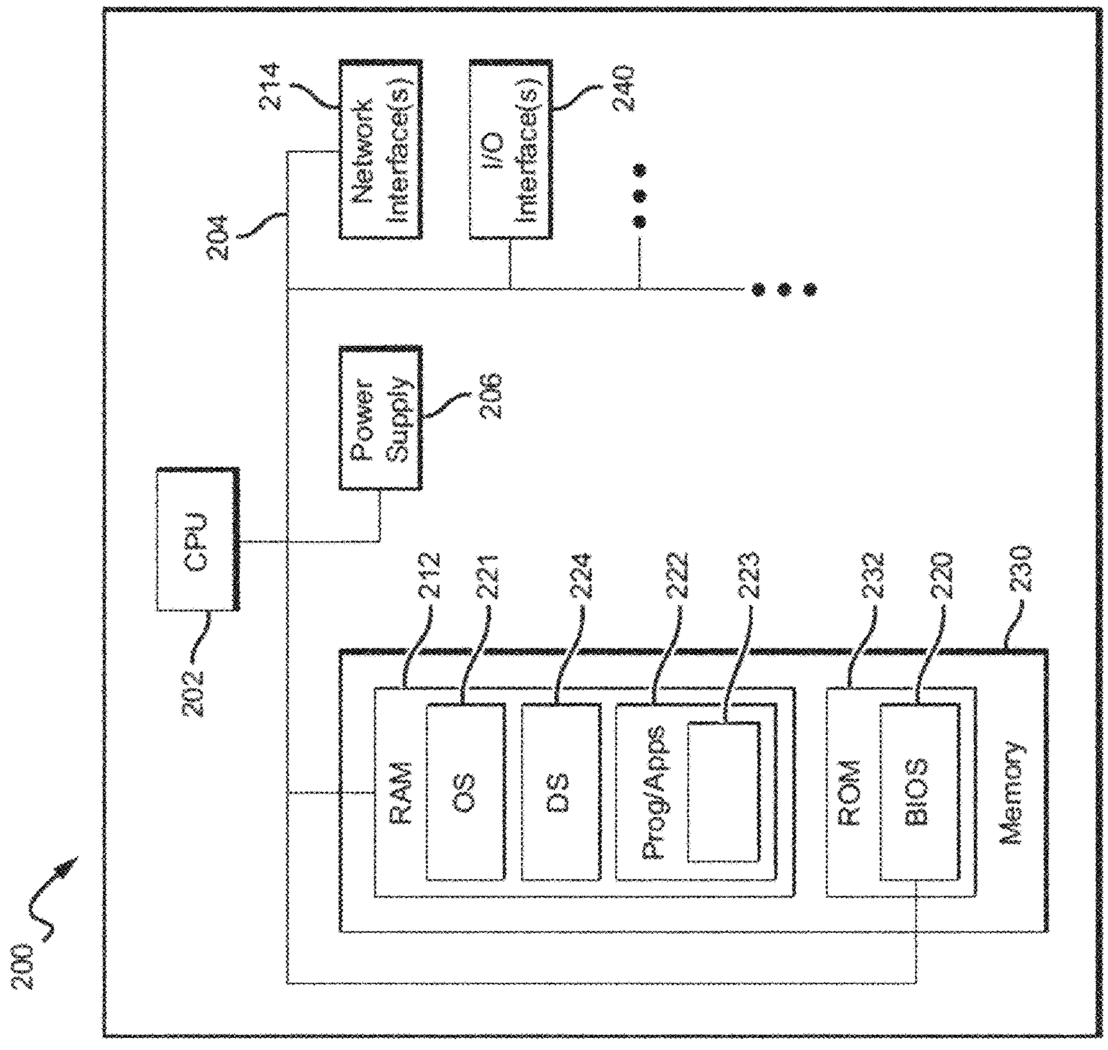
FIG. 2 illustrates an embodiment of a block diagram of an electronic device.

FIG. 2 illustrates a block diagram of an electronic device 200 that can implement one or more aspects of an apparatus, system and method for validating and correcting user information (the "Engine") according to one embodiment of the present disclosure. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the present disclosure. The elements may exist on a single computer or be distributed among multiple computers, servers, devices or entities.

The power supply 206 contains one or more power components and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A “content delivery network” or “content distribution network” (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, “cloud computing,” distributed storage, DNS request handling, provisioning, data monitoring and reporting, content targeting, personalization, and business intelligence. A CDN may also enable an entity to operate and/or manage a third party’s web site infrastructure, in whole or in part, on the third party’s behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both “clients” and “servers” to the other nodes on the network.

Embodiments of the present disclosure include apparatuses, systems, and methods implementing the Engine. Embodiments of the present disclosure may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

In an embodiment, the system may receive, process, generate and/or store time series data. The system may include an application programming interface (API). The API may include an API subsystem. The API subsystem may allow a data source to access data. The API subsystem may allow a third-party data source to send the data. In one example, the third-party data source may send JavaScript Object Notation (“JSON”)-encoded object data. In an embodiment, the object data may be encoded as XML-encoded object data, query parameter encoded object data, or byte-encoded object data.

The present disclosure relates to systems and methods for searching text utilizing categorical touch inputs (hereinafter the “System”). In an embodiment, the System may present sections of text and permit searching thereof via theme or term selection, such that the texts are filtered based on the selected theme or term. Accordingly, the System may enable keyboardless searching of computerized text, for example enabling simple search measures with smart devices comprising touch screens.

Figure 3:
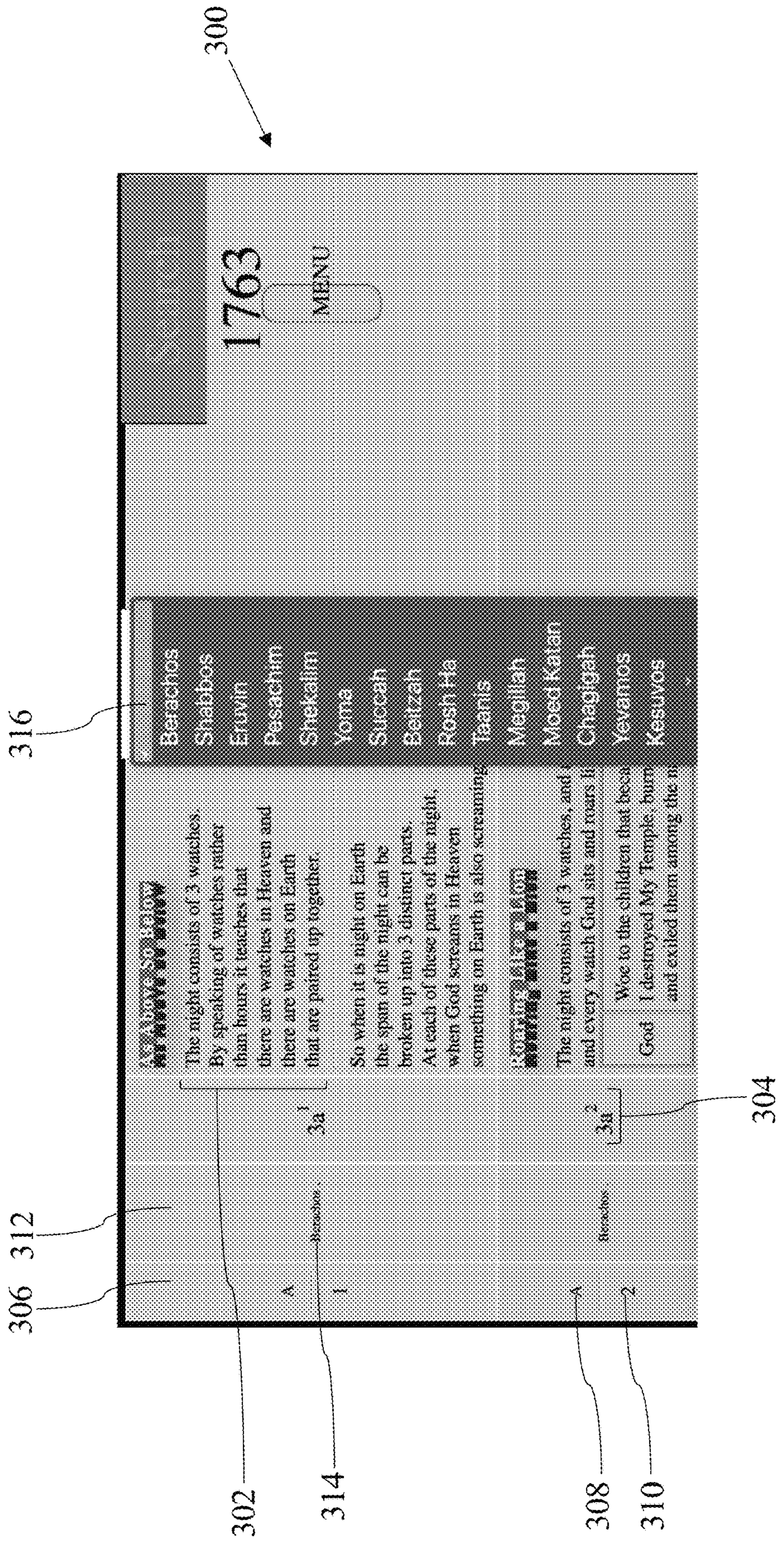
FIG. 3 illustrates an embodiment of a main interface.
Figure 4:
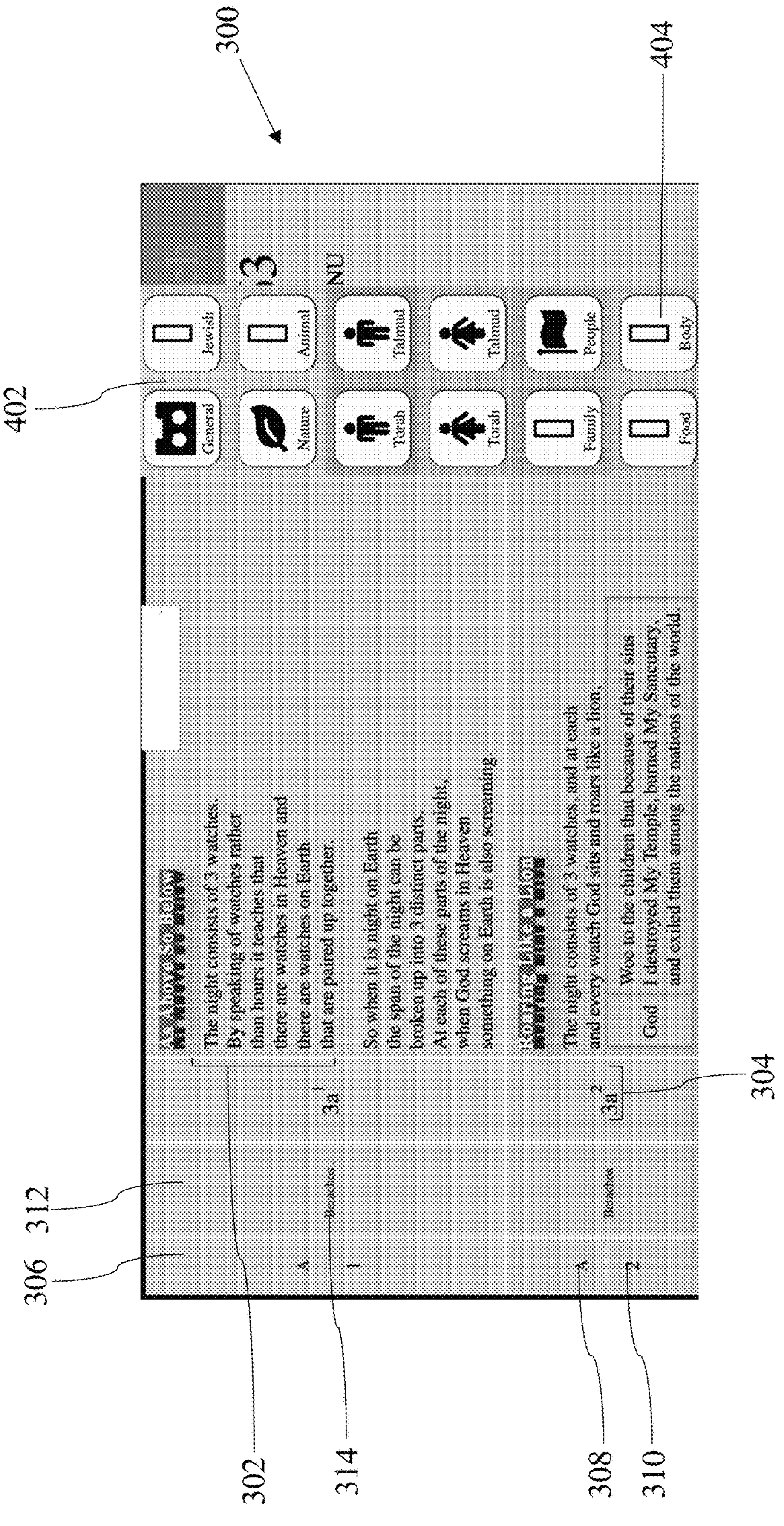
FIG. 4 illustrates an embodiment of the main interface.
Figure 5:
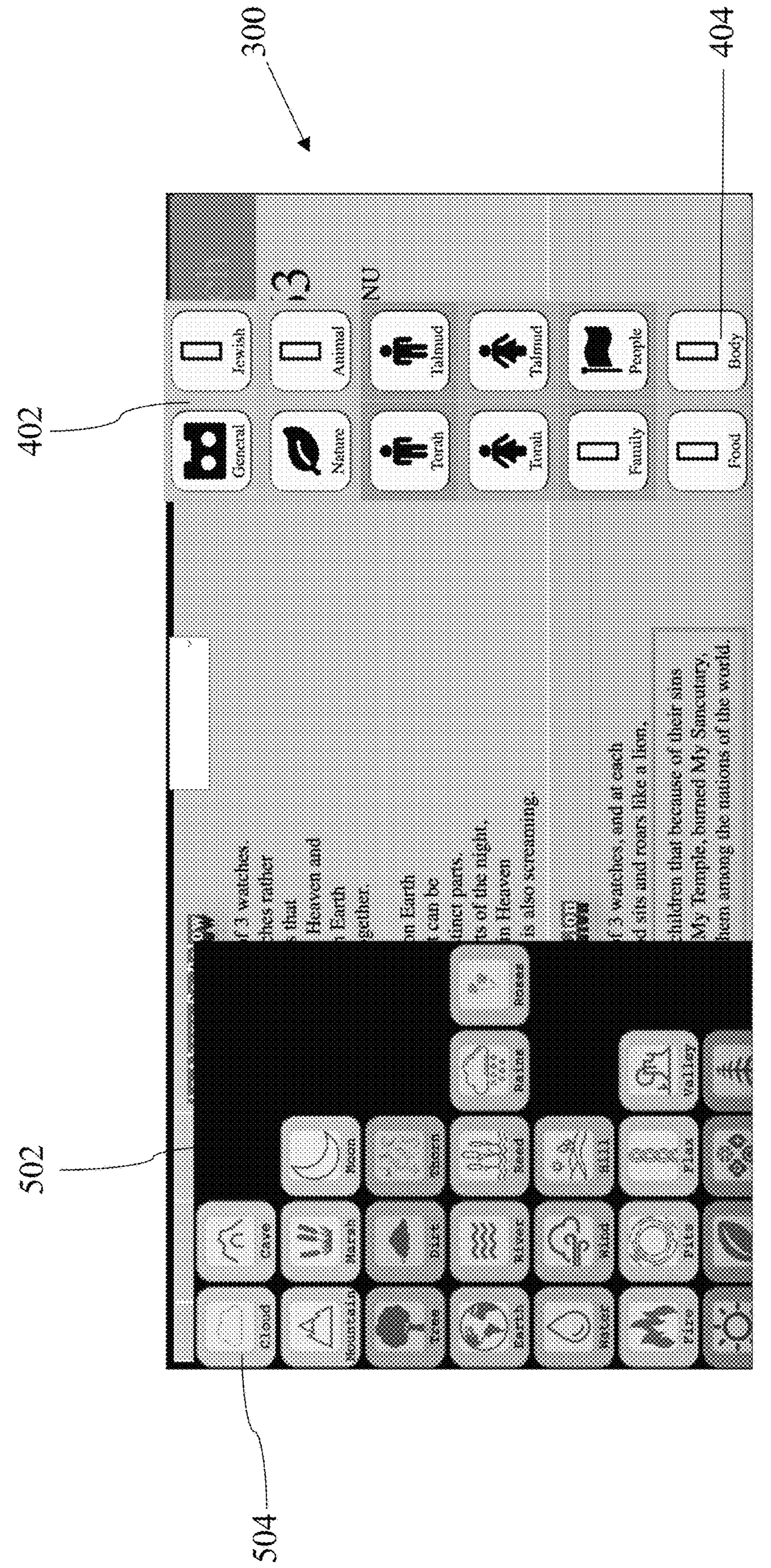
FIG. 5 illustrates an embodiment of the main interface.
Figure 6:
FIG. 6 illustrates an embodiment of best artists.
Figure 7:
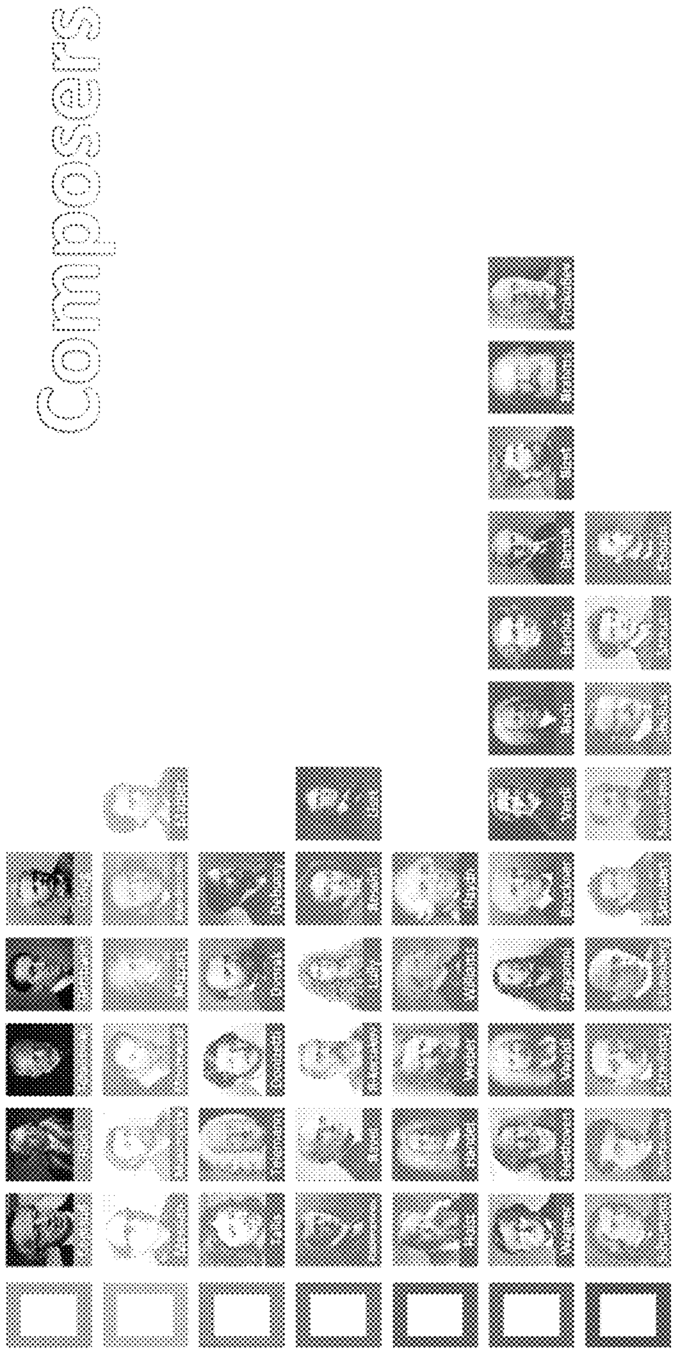
FIG. 7 illustrates an embodiment of best composers.
Figure 8:
FIG. 8 illustrates an embodiment of best philosophers.
Figure 9:
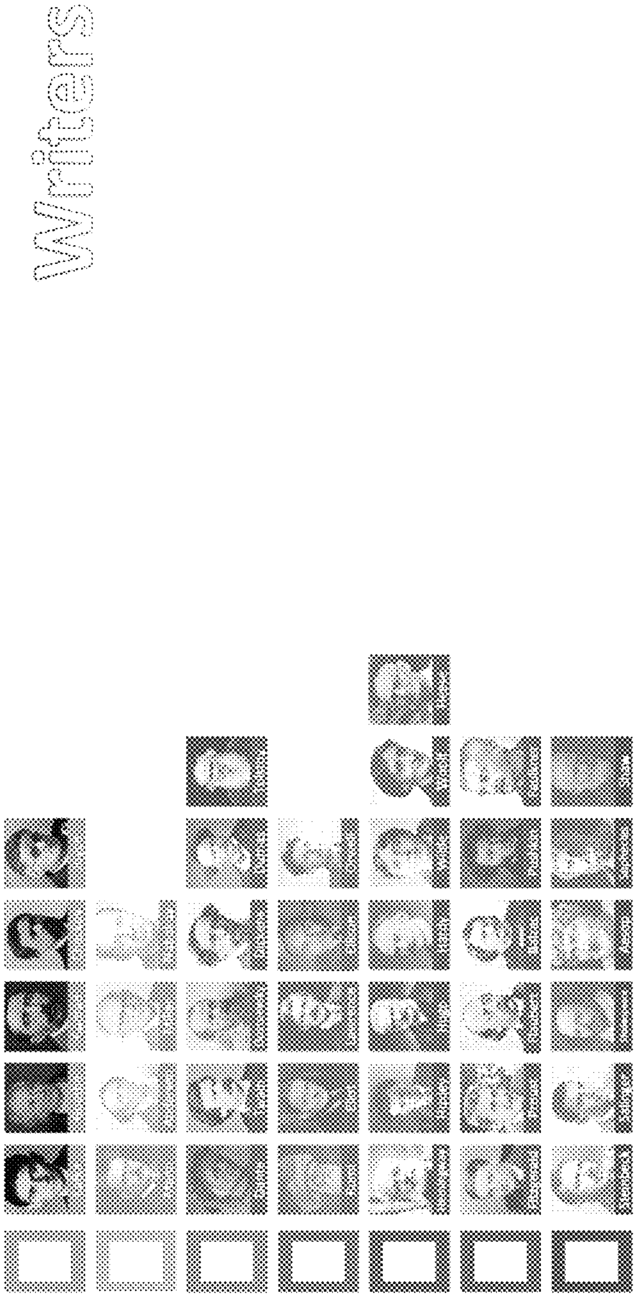
FIG. 9 illustrates an embodiment of best writers.

According to FIGS. 3-5 the System may be comprised of a main interface 300. The main interface 300, and other interfaces described herein, may be a graphical user interface (GUI). In an embodiment, the GUI may be configured to allow presentation of a text. Further, the GUI may be configured to enable user interaction with the text. The main interface 300 may be displayed to a user via a display and may be interacted with via one or more input methods. The one or more input methods may include touch input, keyboard input, or mouse input. The main interface 300 may be in at least one of a filtered state and an unfiltered state. In an embodiment, when the main interface 300 is in at least one of the filtered state and unfiltered state, an entire written work (e.g., the Talmud, Torah, etc.) may be present. In a nonlimiting example, the entire written work may include one or more volumes of text. In an alternative embodiment, when the main interface 300 is in at least one of the filtered state and unfiltered state, the entire written work may not be presented to the user and may not be organized by the one or more volumes of text.

The main interface 300 may organize the entire written work. The entire written work may be organized such that the text, comprising said written work, is displayed in at least one block of text 302. In an embodiment, the at least one block of text 302 may be displayed in one or more rows. In another embodiment, the at least one block of text 302, displayed in the one or more rows, may be arranged in a visually distinct mode. As a nonlimiting example, the visually distinct mode may display the one or more rows encompassing the at least one block of text 302 with a color or other distinguishing characteristic.

The System may be further comprised of one or more identifiable markers 304. In an embodiment, the one or more identifiable markers 304 may serve as a label for the at least one block of text, wherein said one or more identifiable markers 304 may correspond to the one or more volumes of text. As a nonlimiting example, the one or more volumes of text may include a location of the text in a corresponding book and/or name of a book.

The main interface 300 may be organized by a plurality of columns. In an embodiment, the plurality of columns may be comprised of four columns. However, in an alternative embodiment, any suitable number of columns may comprise the plurality of columns. The plurality of columns may include at least one of a primary identifier column, a secondary identifier column, a tertiary identifier column, and the text corresponding to at least one of the primary identifier, the secondary identifier, and the tertiary identifier. One or more of the plurality of columns may convey to the user what volume the at least one block of text 302 is derived from. However, the at least one block of text 302 may be generated and displayed utilizing any suitable method.

In an embodiment, the plurality of columns may be comprised of a first column 306, wherein said first column 306 may consist of a letter 308 or a number 310. As a nonlimiting example, the letter 308 may be placed above the number 310 or vice versa. In a further embodiment, the letter 308 may be based on sets of 3-7 chunks of text (passing through the color order, for example, YELLOW-GRAY-RED-BLUE-GREEN-PURPLE-BROWN). As a nonlimiting example, every Yellow Textual excerpt may start with a letter of the alphabet ranging from A to Z. In such a nonlimiting example, the letter of the alphabet may begin with A and descend through Z for every subsequent Yellow Textual excerpt. Further, after Z has been reached, the order may commence again with A. In another embodiment, the plurality of columns may be comprised of a second column 312. In such an embodiment, the second column 312 may correspond to a book 314 comprising the text. In an alternative embodiment, the second column 312 may begin "fresh" with the letter A. In yet another embodiment, the number 310 may begin at one. In such an embodiment, the number 310 may correspond with the book 314. As another nonlimiting example, a new book may start with a new number.

In an embodiment, the entire written work may be comprised of the one or more volumes of text. In another embodiment, the one or more volumes of text may correspond to a text selection. As a nonlimiting example, the one or more volumes of text may be comprised of one or more books. Said one or more books may be religious books (i.e., the Talmud and/or the Torah). In a further embodiment, the System may be configured to recognize a selection of the one or more volumes of text. In such an embodiment, the System may present the user with the selection of the one or more volumes of text. As a nonlimiting example, the System may present the user with the selection "Berachos" from the Talmud. In such a nonlimiting example, the System may present the user with one or more blocks of text comprising "Berachos."

In an embodiment, the one or more blocks of text 302 may include a title. The title may correspond to the name of the one or more volumes of text presented to the user.

In an embodiment, the System may generate a drop-down menu 316. The drop-down menu may present one or more volumes of text made available to the user via the display. As a nonlimiting example, the drop-down menu may present the one or more volumes of text within the entire written work. Additionally, the user may select a volume, comprising the one or more volumes of text, via the one or more input methods, thus creating a selected volume. In such an embodiment, the main interface may filter the at least one block of text presented to the user based on the selected. In another embodiment, the main interface may only display the selected volume.

In a further embodiment, the main interface may display a reference number, wherein said reference number may track a quantity of the at least one block of text 302. The quantity of the at least one block of text 302 displayed by the main interface 300 may be referred to as a count display. As a nonlimiting example, the count display may correspond to a maximum quantity of the at least one block of text 302 when the main interface 300 is in the unfiltered state. In an embodiment, the count display may decrease when the main interface 300 is in the filtered state, which may correspond to the quantity of the at least one block of text 302 selected from the entire written work. Upon selection of additional text, the count display may increase to correspond with the additional at least one block of text 302 selected.

The System may be further comprised of a main interface menu 402. In an embodiment, the main interface menu 402 may be displayed, via the display, on the main interface 300. The main interface menu 402 may present a plurality of subcategories 404. The plurality of subcategories 404 may be comprised of a theme. In an embodiment, the theme may include at least one of General, Jewish, Nature, Animal, Torah, Talmud, Family, People, Food, and Body. However, the theme may include any suitable theme alternatives. In another embodiment, the plurality of subcategories 404, may be selectable via the one or more inputs.

Further, the plurality of subcategories 404 may be labeled with a name and/or corresponding image. As a nonlimiting example, an image of a leaf may be presented for the "Nature" theme. However, the plurality of subcategories 404 may utilize any suitable name and/or corresponding image alternatives. Furthermore, the plurality of subcategories 404 may be visually presented, via the display, according to a method of sorting. In an embodiment, the plurality of subcategories 404 may be color-coded. In such an embodiment, the at least one block of text 302 sharing the same theme as the plurality of subcategories 404 may be presented as the same color. In another embodiment, the plurality of subcategories 404 may appear in order or randomly. In an alternative embodiment, the plurality of subcategories 404 may be presented in two columns. However, the order and presentation of the plurality of subcategories 404 may be organized in any suitable alternative. For example, the plurality of subcategories may be organized by using three or more columns, or one column.

The System may be further comprised of a tile interface 502. The tile interface 502 may be generated when the System recognizes a selection of the plurality of subcategories 404. In an embodiment, the tile interface 502 may display, via the display, a plurality of content tiles 504. Accordingly, the displayed plurality of content tiles 504 may correspond to the plurality of subcategories 404. In an embodiment, the main interface 300 may display, via the display, the plurality of subcategories 404. In another embodiment, the user may select, via the one or more inputs, a single subcategory (e.g., "Animal"), comprising the plurality of subcategories 404. In such an embodiment, the plurality of content tiles 504 may be organized utilizing a predetermined method based upon which subcategory of the plurality of subcategories 404 the user selected. In another embodiment, the plurality of content tiles 504 may be generated and displayed, via the display, in any relevant and/or suitable arrangement. In an embodiment, the plurality of content tiles 504 may be sorted by their Soundex value.

The Soundex Value System may organize a given dataset phonetically. The organization may rely upon a word's phonetic string. Letters may share phonetic strings such that when the letters are vocalized, they make similar sounds. In an embodiment, the plurality of content tiles 504 may be comprised of one or more words. The plurality of content tiles 504 comprising the one or more words sharing similar Soundex Values may be grouped in the same bin. A single content tile, comprising the plurality of content tiles 504, grouped in the same bin may be in the same row. In another embodiment, the rows may be sorted. For example, the plurality of content tiles 504 with letters sharing the same phonetic string (e.g., "c," "g," "j," "e," or "k") may be in a first row. However, the plurality of content tiles 504 may be sorted in any suitable alternatives.

The plurality of content tiles 504 may be selectable via the one or more inputs. In an embodiment, the plurality of content tiles may be labeled with a name and/or a corresponding image. Furthermore, the plurality of content tiles 504 may be color coded according to the method of sorting. The plurality of content tiles 504 with the same method of sorting may be in the same bin. For example, tiles in the same Soundex Value may be in the same bin. Moreover, the plurality of content tiles 504 may appear in an order. As a nonlimiting example, the plurality of content tiles 504 sharing phonetically similar strings may be in a first bin. The plurality of content tiles 504 in the same bin may be grouped in the same row.

Referring to FIGS. 6-9, in a further embodiment, the plurality of content tiles 504 may be comprised of a plurality of subjects. In an embodiment, the plurality of subjects may be at least one of, best artists 600, best composers 700, best philosophers 800, and best writers 900.

Figure 10:
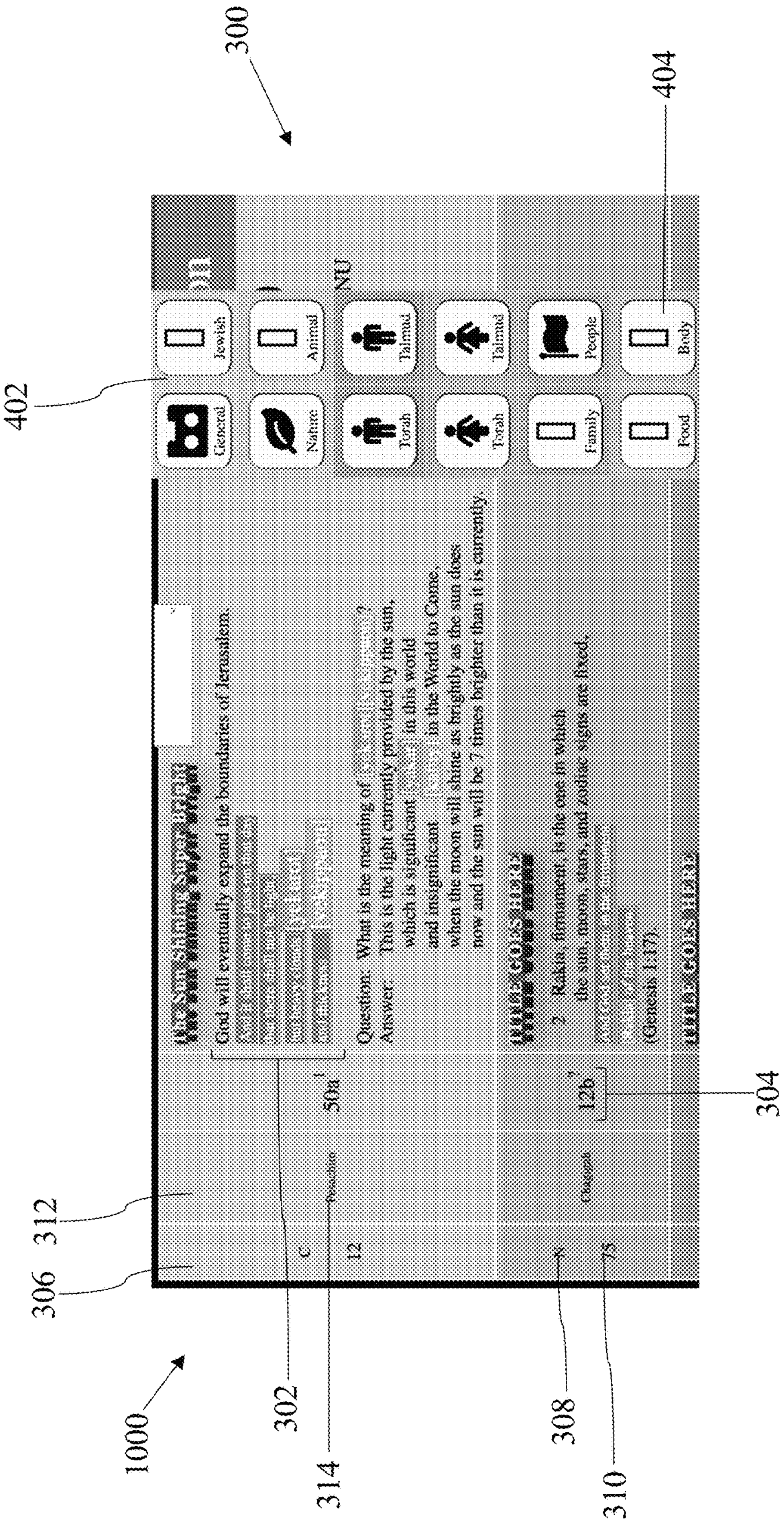
FIG. 10 illustrates an embodiment of the main interface in a sorted configuration.

Turning to FIG. 10, in another embodiment the main interface 300 may be in a sorted configuration, thus creating a sorted interface 1000. The System may recognize a selection of the plurality of content tiles 504 such that the main interface 300 may display, via the display, the sorted interface 1000. The sorted interface 1000 may display, via the display, the at least one block of text 302 within the entire written work corresponding to one of the plurality of content tiles selected by the user. In an embodiment, the at least one block of text 302 may be visually organized (e.g., organized by color). The sorted interface may display the one or more identifiable markers 304, wherein said markers 304 may correspond to a location of the text within the entire written work. As a nonlimiting example, the identifiable marker is comprised of a number, a letter, and an exponent. In such a nonlimiting example, the number may correspond to a page number of the written work, and the letter may correspond to the side of the page of the written work. In an embodiment, the location of the text within the written work may correspond to the one or more volumes. In another embodiment, the exponent may represent a breakdown of each page of a text into one or more computerized chunks. In a further embodiment, the one or more computerized chunks may be hyperlinked to one or more other texts. As a further nonlimiting example, each of the 5000 pages of the Talmud are comprised of roughly 20 computerized chunks, which may be defined by the SEFARIA online version of the Talmud.

The user selection of one of the plurality of content tiles, may search the entire written work corresponding to the theme of said content tile, wherein said theme is derived from one of the plurality of subcategories selected by the user. In an embodiment, the System may seek out the entire written work corresponding to the theme of said content tile. Further, the main interface 300 may generate the text corresponding to the theme of the content tile. As a nonlimiting example, selection of a "David" tile may search the entire written work for at least one block of text 302 corresponding to "David." In continuance of such a nonlimiting example, the at least one block of text 302 corresponding to "David" may present said text on the main interface 300 and/or the sorted interface 1000.

The System may be further comprised of a search function. In an embodiment, the search function may be displayed, via the display, on the main interface 300 and/or the sorted interface 1000.

The System may utilize a sorting function. A text file comprising the written work may be imported into the System, thus creating a written work file. In an embodiment, said the written work file may be stored in a database. Further, the System may recognize text embedded within the written work file. In another embodiment, the System may recognize the text embedded within the written work file via an optical character recognition (OCR). In an alternate embodiment, the System may receive a search term input via user entry from the one or more input methods. Further, upon user entry of the search term, the System may pull text matching the search term, thus creating matched text. The System may organize the matched text into one or more bins. In a further embodiment, the matched text may be organized into a "match" bin. Dissimilar text may be organized into a "mismatch" bin. The System may further display, via the display, the matched text from the "match" bin to the user. The matched text may be displayed, via the display, on the main interface 300 and/or the sorted interface 1000.

In an embodiment, the text, comprising the written work, may be manually pre-tagged to correspond with the theme of the plurality of content tiles 504. The System may receive the search term input via user entry or user utilization of the plurality of content tiles 504. Upon receipt of the search term, the System may secure text pre-tagged with the search term. The System may organize the results into one or more bins. Text pre-tagged with the search term may be organized into the "match" bin. Dissimilar text may be organized into the "mismatch" bin. The System may further display, via the display, the secured text from the "match" bin to the user. The secured text may be displayed in a visually appealing way on the main interface 300.

Text may be pre-tagged to enable the search function such that it follows a method. A selection of text, comprising the written work, may be chosen by the user. The selection of text may be located from a public data portal. The selection of text may be copied into a main data set. Further, the selection of text may be tagged according to the volume, page, and sf-index fields before being copied and/or pasted into the main data set. The selection of text may then be manually copied and/or pasted by the user into one or more assigned slots.

In further embodiments, various HTML layerings may be applied. In an embodiment, archaic words and/or phrases comprising the text may be replaced. Table Layering may be utilized for instances when the text includes one or more characters within the text of the written work who are engaging in conversation. Verse Layering may be utilized when a versus appears. Said Verse Layering may display the specific words in at least one of a different font, a different background, and an overall different style. Wordplay Layering may be utilized when specific words are required, such as but not limited to transliterated Hebrew words. Layering may be utilized to organize counted sets. Further, the Patterned Table layering may also be utilized to organize the counted sets. The Patterned Table Layering may be utilized to organize pattern words. In an embodiment, line breaks may be utilized to organize phrases. In a further embodiment, horizontal rows may be utilized to separate ideas. The excerpts may be divided by Sefaria chunks. The Sequencing Setup may be utilized when narrative flow is preserved.

In an embodiment, empty JSON slots may be filled in. Said empty slots may include "add a title," "add any ancient tokens," "add a color gamify package sequence," "add a volume number index," and/or "add all relevant 3-tier taxonomy tags."

In an embodiment, taxonomy automation may be utilized. A variable may be any phrase. The methods ".contains" and ".beginswith" may be utilized. Further, "2-ples" may be utilized to run through the entire text for all taxonomy tags. The correct isolation method may be utilized. All 800 taxonomy level3 units may be looped. Further, the whole text may be tagged.

Figure 11:
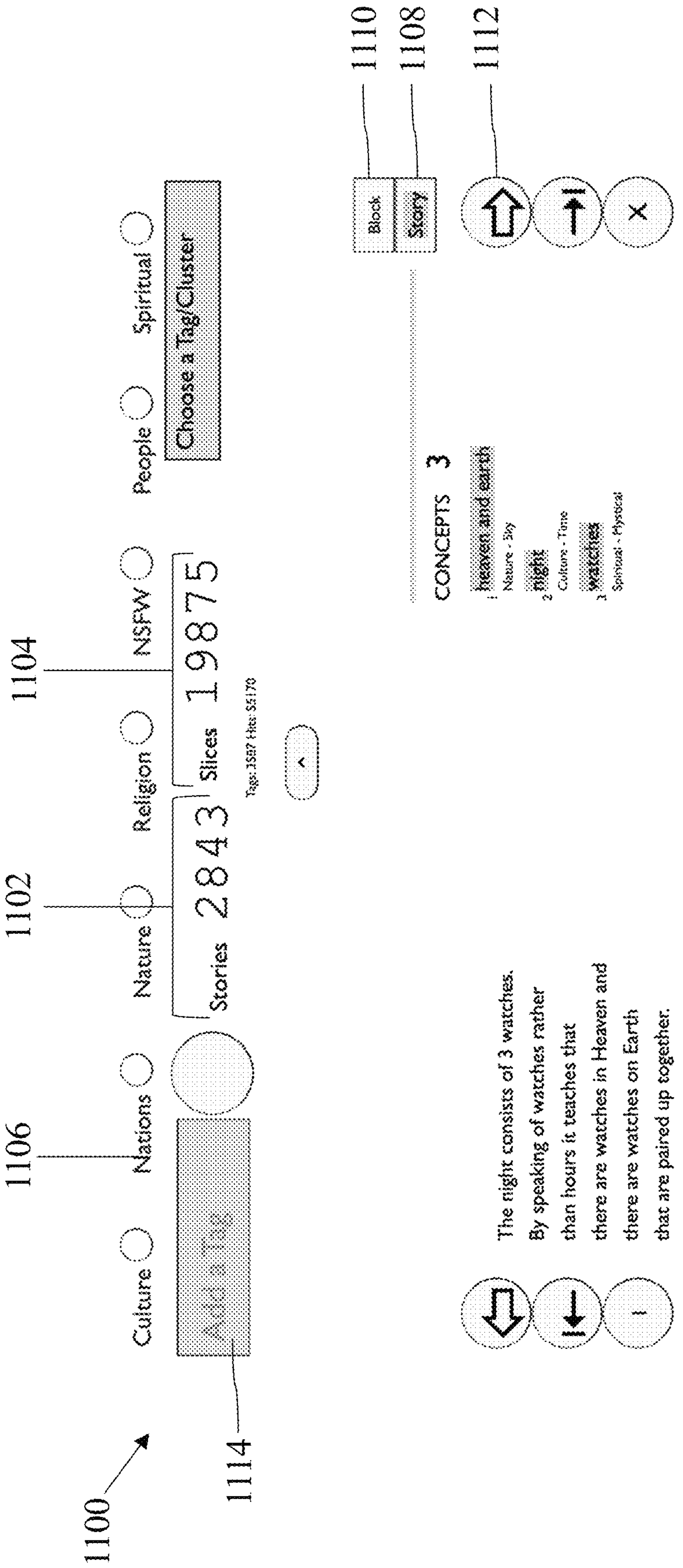
FIG. 11 illustrates an embodiment of an alternate main interface.
Figure 12:
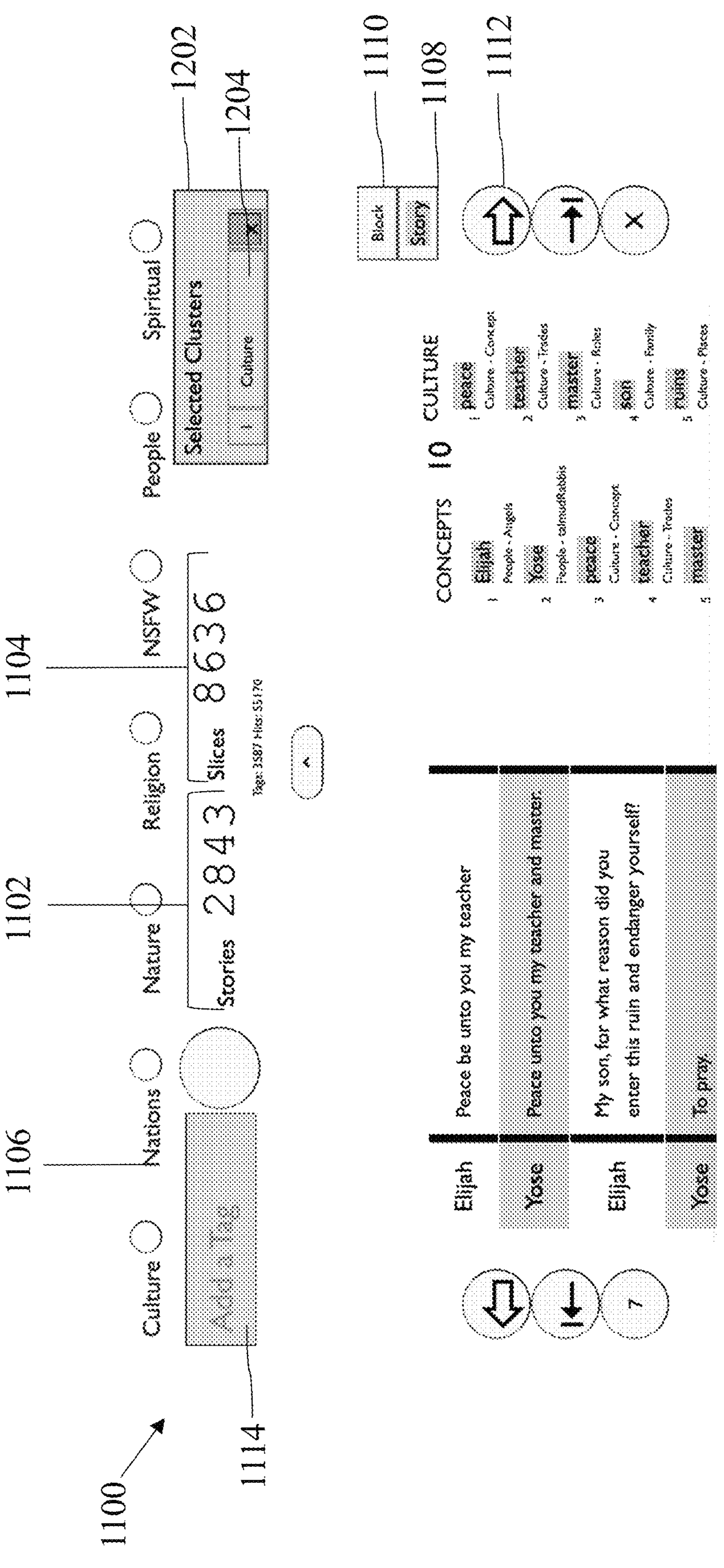
FIG. 12 illustrates an embodiment of the alternate main interface.
Figure 13:
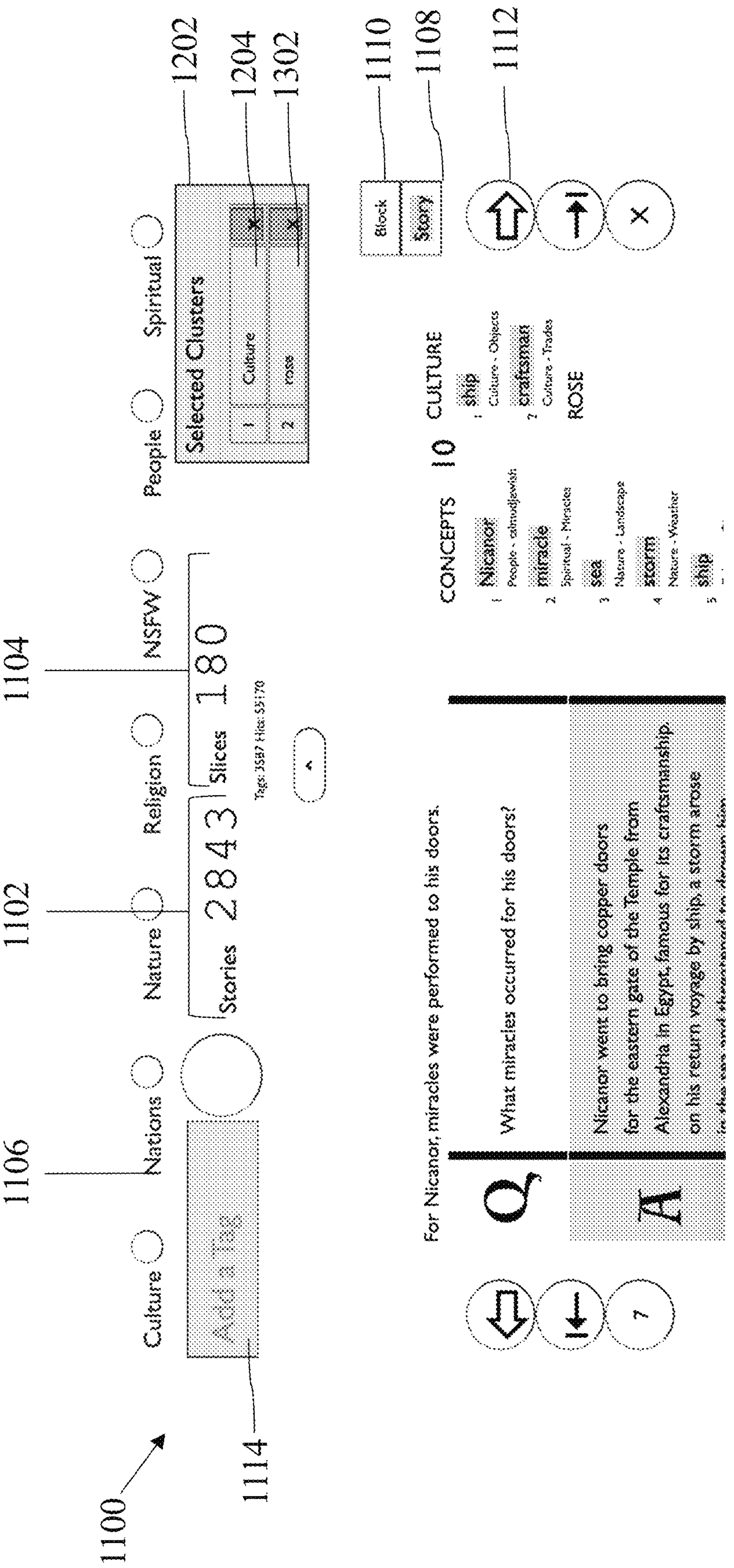
FIG. 13 illustrates an embodiment of the alternate main interface.

Referring to FIGS. 11-13, in an embodiment, the System may further comprise an alternate main interface 1100. The alternate main interface 1100 may comprise a plurality of stories and/or a plurality of slices. Said interface 1100 may be displayed to the user via the display. The plurality of stories may be a compilation of written works. The plurality of slices may be a sub selection of the written works. The alternate main interface 1100 may include a plurality of clusters 1106. The plurality of clusters 1106 may include at least one of Culture, Nations, Nature, Religion, NSFW, People, and Spiritual. The alternate main interface 1100 may display the plurality of clusters 1106. The System may recognize deselection of the plurality of clusters 1106 upon selection of an "x" icon next to one of the plurality of clusters chosen by the user. The alternate main interface 1100 may include a story feature 1108 such that the System may organize the presented text by a story. In an embodiment, the story may be comprised of a plurality of slices. In a nonlimiting example, the plurality of slices may be comprised of 100 bits. The alternate main interface 1100 may include a block feature 1110 such that the System may organize the presented text by a block.

The alternate main interface 1100 may include an "x" icon such that when the "x" icon is selected, the plurality of clusters 1106 may refresh. Refreshing the plurality of clusters 1106 may clear the previous search such that a new search may be initiated. There may be a "I" icon on the alternate main interface 1100, which upon selection may display numbers in decreasing order.

The System may recognize a selection of at least one of the plurality of clusters 1106, such that the alternate main interface 1100 may display, via the display, one of the plurality of slices. In an embodiment, user selection of the cluster, "Culture," comprising the plurality of clusters 1106, may create a selected cluster 1202. In another embodiment, the selected cluster 1202 may be displayed in a selected clusters box 1204. In a further embodiment, the System may display, via the display, one of the plurality of slices corresponding to the "Culture" cluster.

The alternate main interface 1100 may present a plurality of arrows 1112. The alternate main interface 1100 may display "up," "down," "left," and "right" arrows. The "left" and "right" arrows may initiate scrolling through the plurality of slices 1104. The "left" and "right" arrows may initiate sequential scrolling. In a further embodiment, there may be a second set of "left" and "right" arrows such that the alternate main interface 1100 may skip to the first and/or last of the plurality of slices 1104. The alternate main interface 1100 may further present "up" and "down" arrows which may be configured by the user to navigate through menus or categories, for example, cycling through at least one of the plurality of clusters 1106, the plurality of stories 1102, and the plurality of slices 1104. In an embodiment, the user may select the plurality of clusters 1106, wherein selecting one or more of the plurality of clusters 1106 may present one of the plurality of slices. Selection of one of the plurality of clusters may display concepts organized by the Soundex System.

The System may recognize a manual tag 1302 in the alternate main interface 1100. The manual tag 1302 may be displayed in the selected clusters box 1204. In an embodiment, the alternate main interface 1100 may incorporate a tag search bar 1114, wherein the System may recognize the manual tag 1302. In another embodiment, the user may input the manual tag. In a further embodiment, following user input of the manual tag 1302, the alternate main interface 1100 may display the plurality of slices 1104 associated with the manual tag. In a further embodiment, the user may organize the selection by the block and/or the story.

Figure 14:
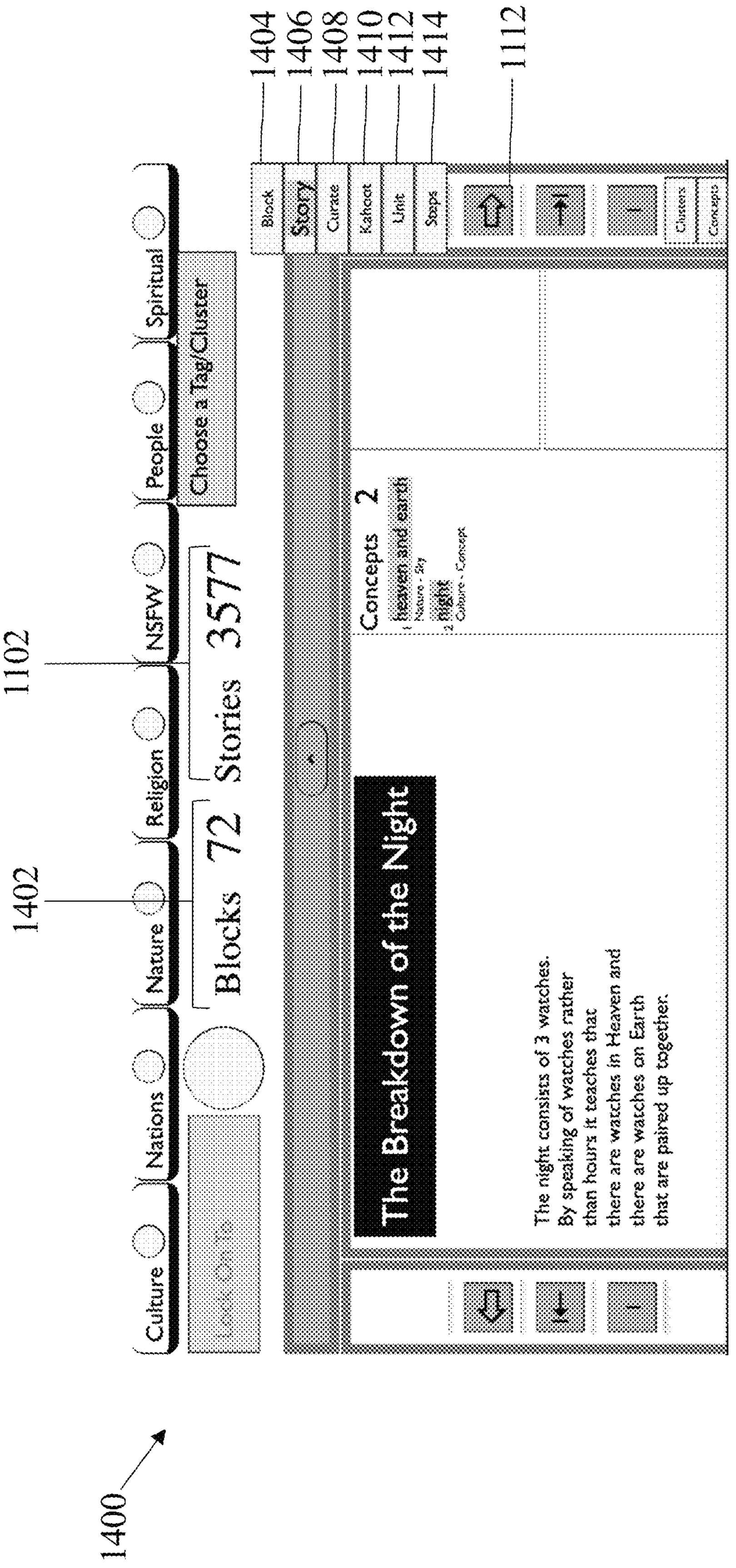
FIG. 14 illustrates an embodiment of a secondary alternate main interface.
Figure 15:
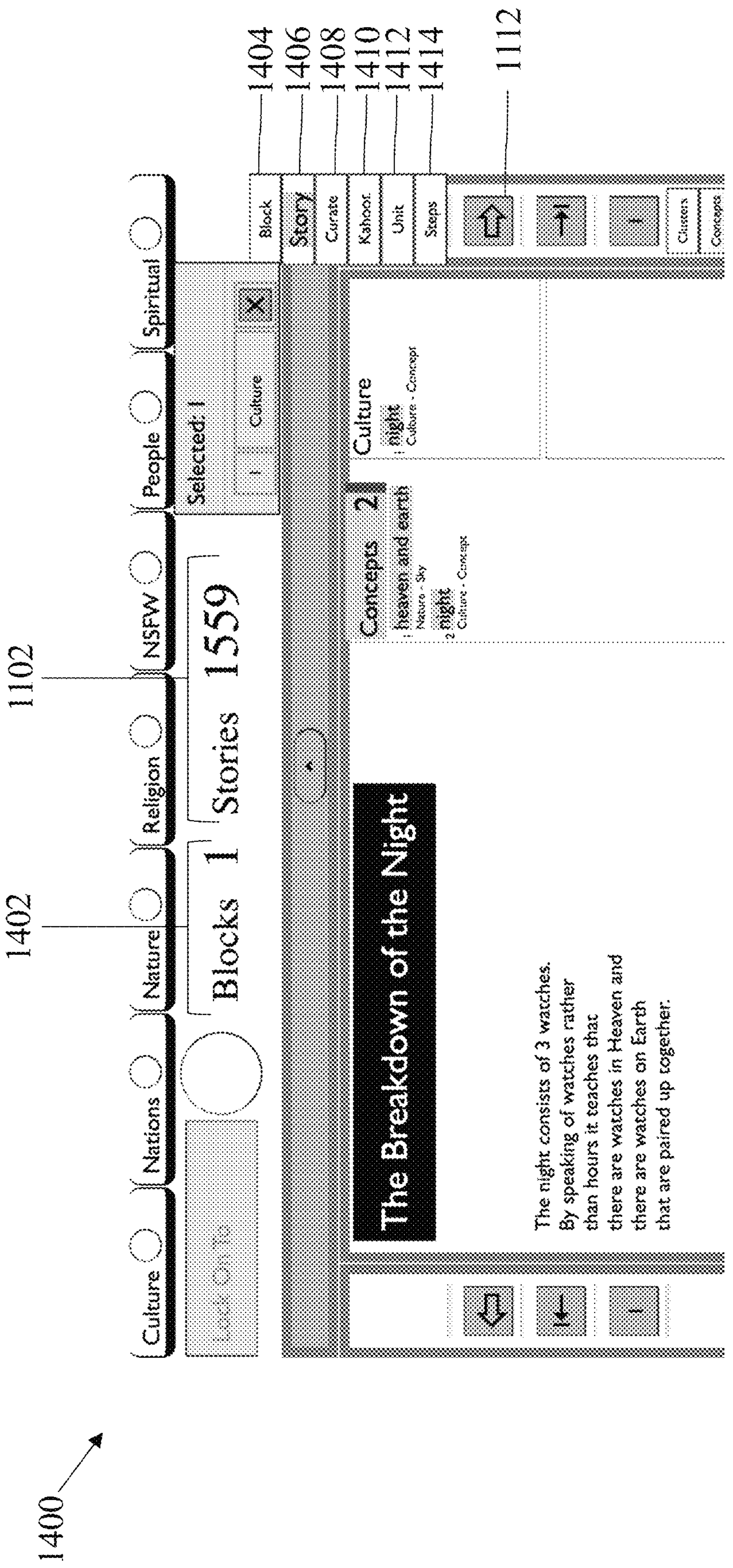
FIG. 15 illustrates an embodiment of the secondary alternate main interface.
Figure 16:
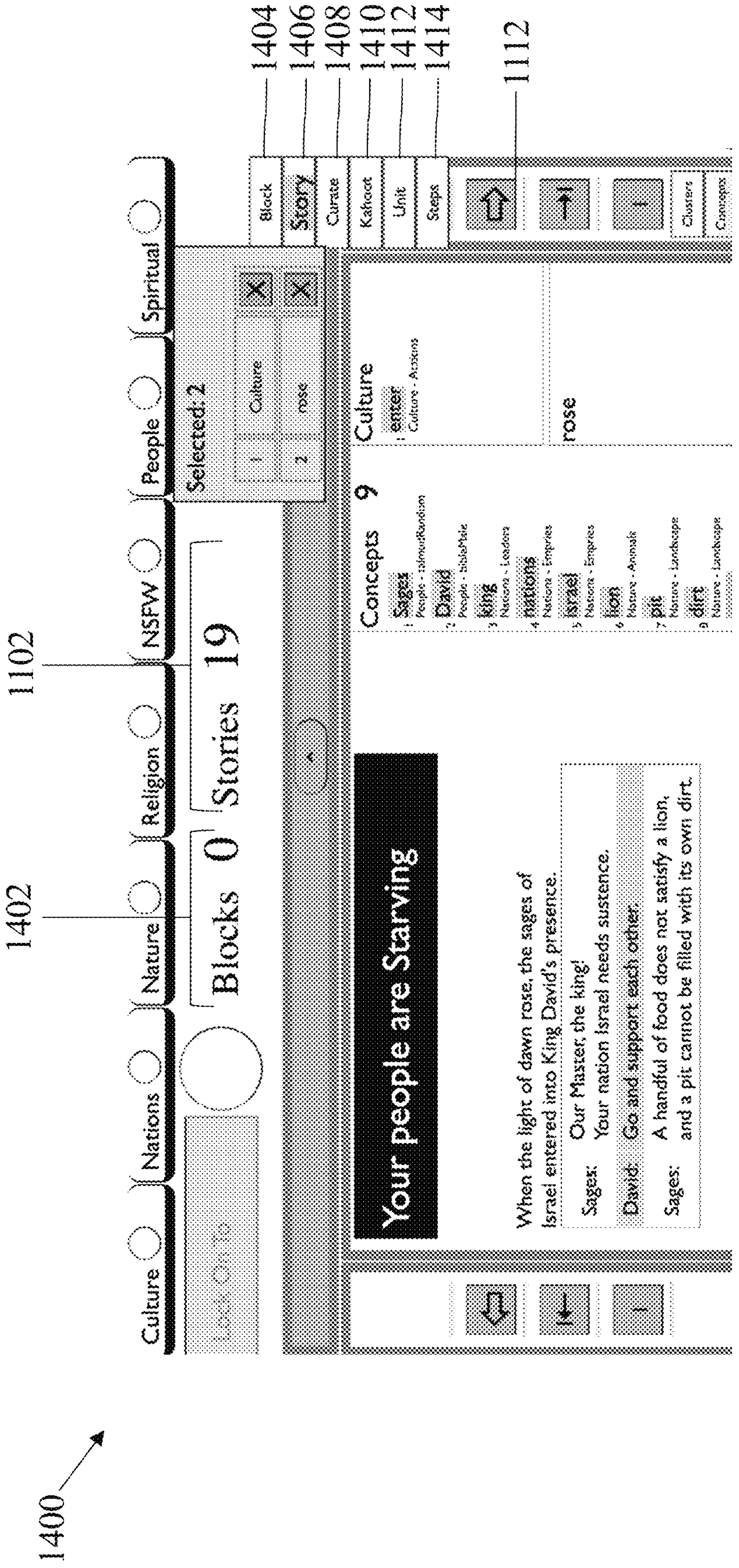
FIG. 16 illustrates an embodiment of the secondary alternate main interface.

Referring to FIGS. 14-16, the System may be further comprised of a secondary alternate main interface 1400. The secondary alternate main interface 1400 may display, via the display, a plurality blocks 1402 and/or the plurality of stories 1102. In an embodiment, the plurality of blocks 1402 may be comprised of selected text from the written work. In another embodiment, the plurality of stories 1102 may be selected text within the plurality of blocks 1402. The System may recognize the user's selection of at least one of the manual tag 1302 and the selected cluster 1204. In an embodiment, the manual tag 1302 and/or the selected cluster 1204 may include the theme.

The System may recognize a user's selection of at least one of the manual tag 1302 and the selected cluster 1204. Upon selection, the secondary alternate main interface 1400 may present the user with a sub selection of text. The sub selection of text may be presented in the plurality of stories 1102. In some embodiments, the sub selection of text may be presented in the plurality of blocks 1402.

In a further embodiment, the secondary alternate main interface 1400 may include the plurality of arrows 1112. The plurality of arrows 1112 may allow the user to sequentially scroll through different textual outputs. The System may present a concept organized according to the Soundex System described above.

The System may further display "clusters" and "concepts" buttons. Upon first selection of the "clusters" button, the System may remove the plurality of clusters 1106 from at least one of the main interface 300, the alternate main interface 1100, and the secondary alternate main interface 1400. In another embodiment, upon second selection of the "clusters" button, the System may display the plurality of clusters 1106 from at least one of the main interface 300, the alternate main interface 1100, and the secondary alternate main interface 1400. In a further embodiment, upon first selection of the "concepts" button, the System may remove the concept from at least one of the main interface 300, the alternate main interface 1100, and the secondary alternate main interface 1400. In yet a further embodiment, upon second selection of the "concepts" button, the System may display, via the display, the concept in at least one of the main interface 300, the alternate main interface 1100, and the secondary alternate main interface 1400.

In an embodiment, the user may manually enter the manual tag 1302 and/or the selected cluster 1202. As a nonlimiting example, the System may recognize the entry of "rose" into the tag search bar 1114, wherein "rose" is the desired search term. In an embodiment, the System may recognize the entry of the search term. In a further embodiment, the secondary alternate main interface 1400 may display the plurality of blocks 1402 and/or the plurality of stories 1102 where the search term is a theme in the text. The entry may be organized according to the Soundex System described above.

The user may organize entry of one or more search terms according to alternate systems. In an embodiment, the user may organize according to Block 1404, Story 1406, Curate 1408, Kahoot 1410, Unit 1412, and Steps 1416.

Figure 17:
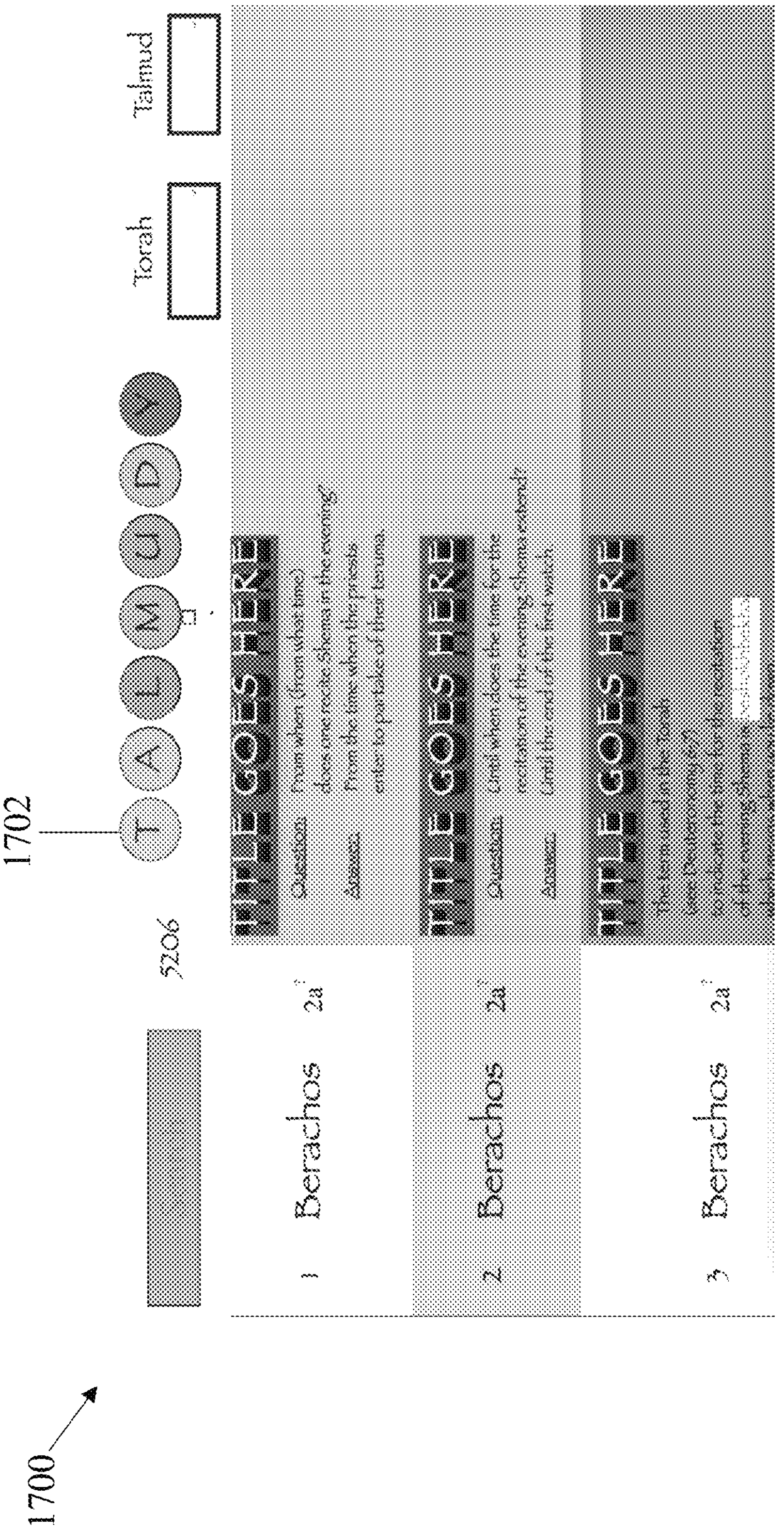
FIG. 17 illustrates an embodiment of a tertiary alternate main interface.

Referring to FIG. 17, the System may include a tertiary alternate main interface 1700. In an embodiment, the tertiary alternate main interface may be comprised of a plurality of buttons 1702 configured to perform a function. As a nonlimiting example, the T button may toggle between settings that either show and/or hide the entire first column (of excerpt letter); the A button may toggle between settings that either show and/or hide the entire second column (of excerpt number); the L button may toggle between settings that either show and/or hide the entire third column (of book name); the M button may toggle between settings that either show and/or hide the entire fourth column (of page number); the U button may toggle between settings that either show and/or hide the TITLE AREA above the textual excerpt; the D button may toggle between settings that either show and/or hide the textual excerpt; the Y button may restore any currently hidden columns and/or areas above if they are hidden. In a further embodiment, the Y button may be configured to reset a view to a default state. In some embodiments, there may be a checkbox, which may be selected to toggle between the column-excerpt view as depicted and the small-box view showing numbered excerpts only, while hiding all titles and textual excerpts.

Figure 18:
FIG. 18 illustrates an embodiment of a quaternary alternate main interface.

Turning to FIG. 18, the System may be further comprised of a quaternary alternate main interface 1800.

Figure 19:
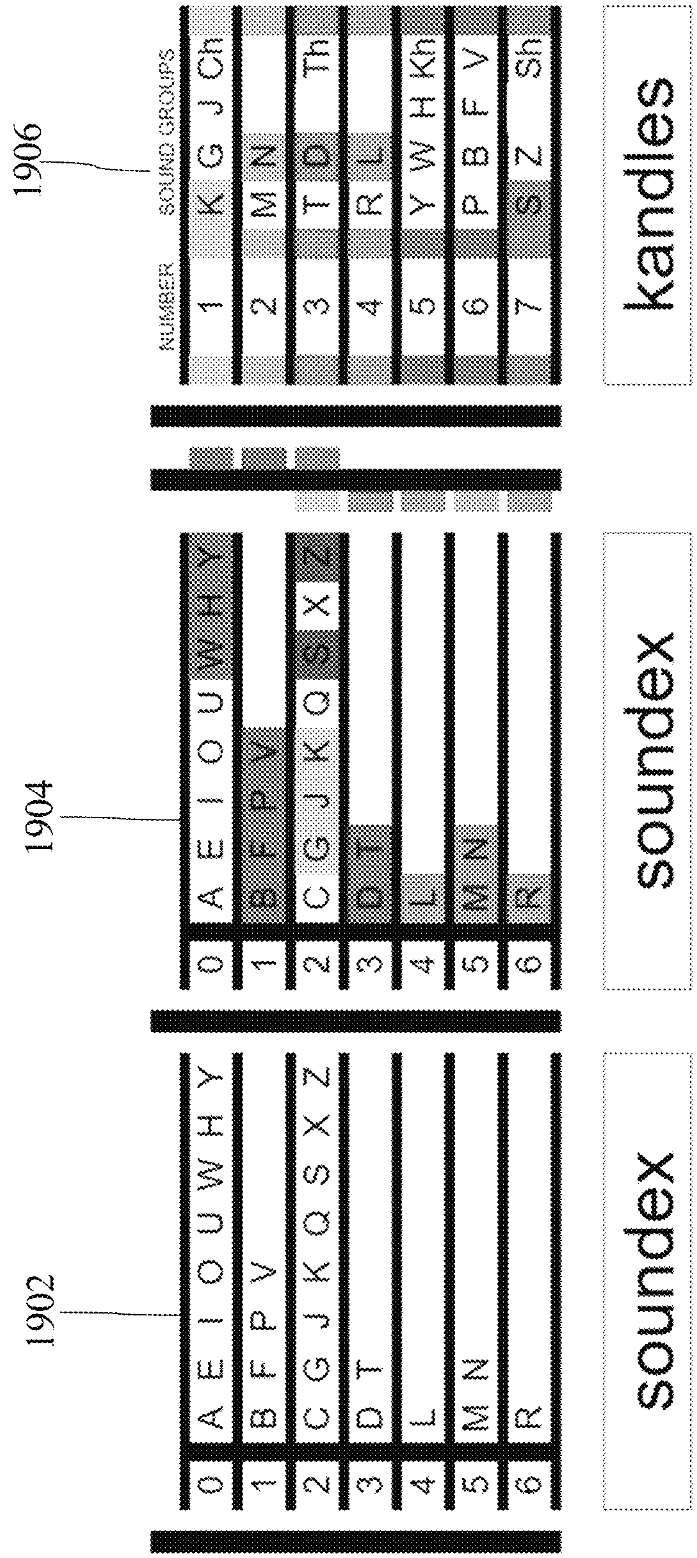
FIG. 19 illustrates an embodiment of at least one of a standard Soundex grouping system, an improved Soundex grouping system, and a kandles grouping system.

Moving to FIG. 19, in an embodiment, a standard Soundex grouping system 1902, an improved Soundex grouping system 1904, and/or a kandles grouping system 1906 may group the plurality of content tiles 504 and further color code said tiles 504 as a function of a user selecting the first letter of one or more of the plurality of content tiles 504. In yet a further embodiment, grouping the plurality of content tiles 504 may further include a plurality of bins. Said method may also utilize a grouping scheme based on phonetic strings, where, when vocalized, said strings may be comprised of similar sounds. The aforementioned grouping scheme may provide the benefit of an interface that is based upon aligning at least one of the sounds, colors, and words in a precise position. Such a precise position may elicit a desired effect to move through various quotes and/or the at least one block of text 302. As a nonlimiting example, words sharing the same phonetic string (e.g., "k," "g," "j," and "ch") may be in the same bin.

Referring to FIG. 20, the System may further comprise an alternate Soundex grouping system 2000. In an embodiment, the alternate Soundex grouping system 2000 may provide grouping based on phonetic strings of languages other than English. In an embodiment, the grouping may be based on the Korean language. However, any suitable language alternative may comprise the phonetic strings of languages. Further, the alternate Soundex grouping system may correspond to various objects in nature. As a nonlimiting example, words with significance or relation to the sun may be in the same bin. The alternate Soundex grouping system 2000 may continue to employ the usage of color-coding, number coded bins, and bins adapted to organize words sharing the same phonetic string.

Figure 21:
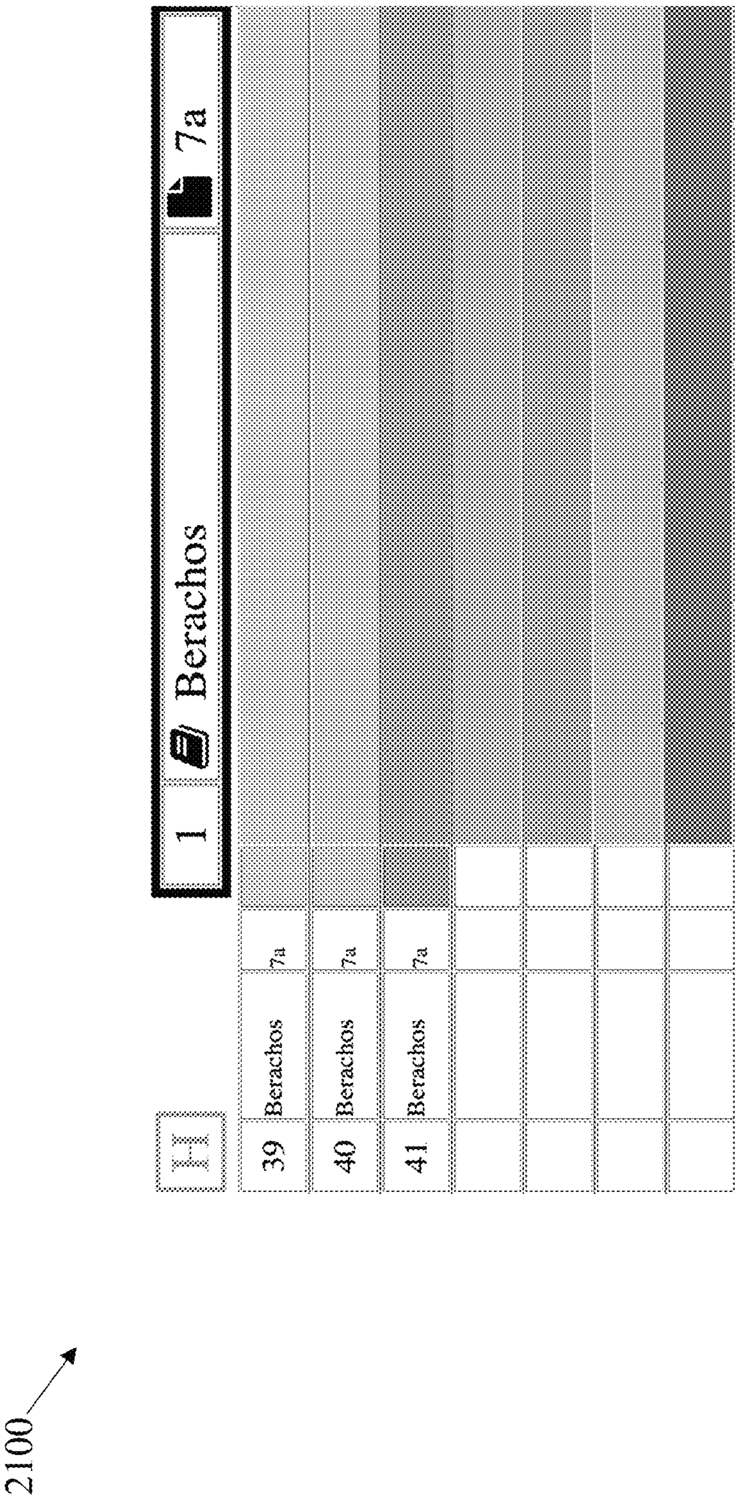
FIG. 21 illustrates an embodiment of a volume selection.
Figure 23:
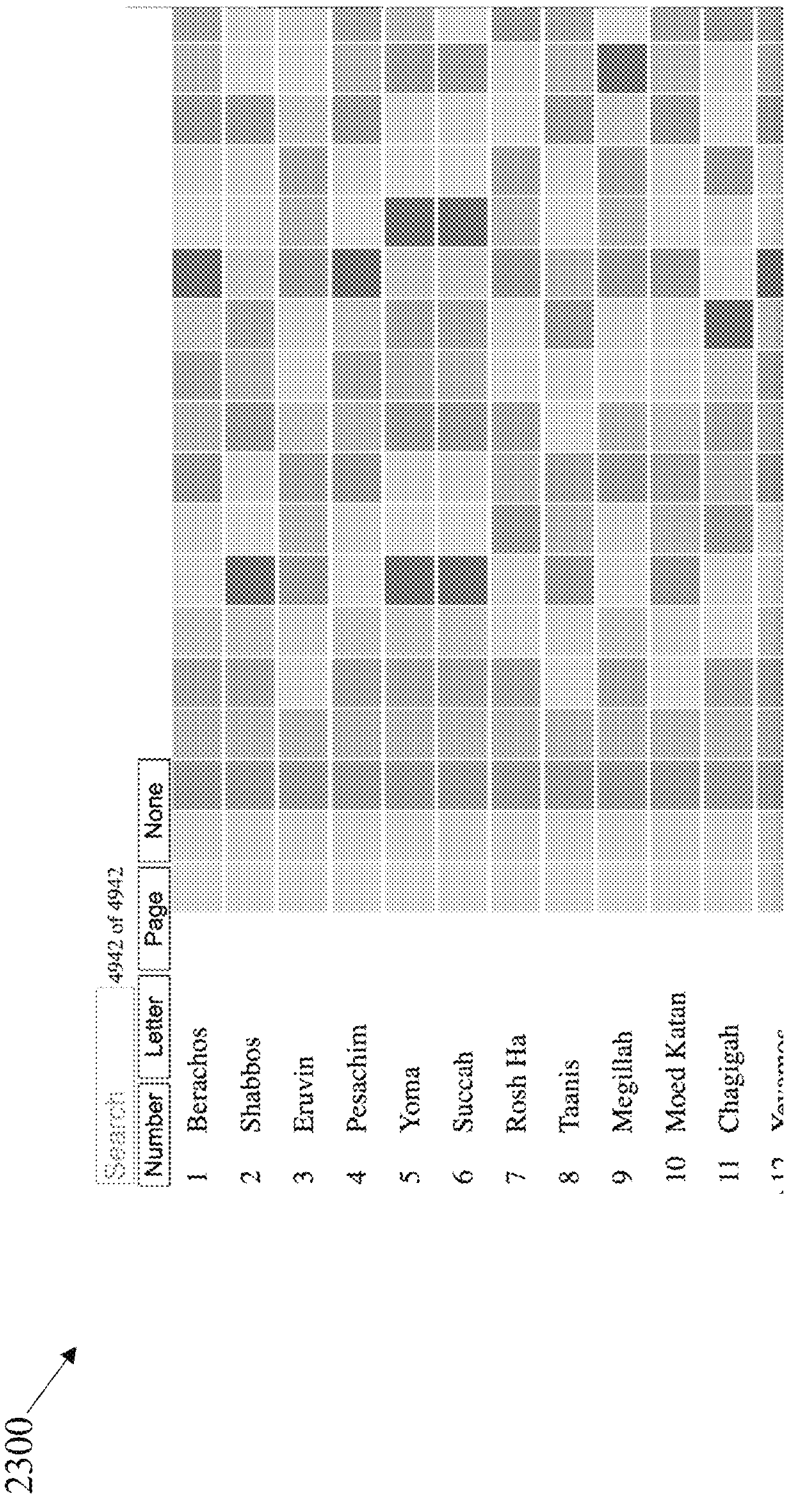
FIG. 23 illustrates an embodiment of a tertiary volume selection.

Turning to FIGS. 21-23, the System may be further comprised of a volume selection 2100. The volume selection 2100 may be color-coded. The System may be further comprised of a secondary volume selection 2200. The secondary volume selection 2200 may be color-coded. In a further embodiment, the secondary volume selection 2200 may provide additional information. In an embodiment, the additional information may be comprised of at least one of page, corresponding letter, corresponding number, and title of the volume selection. The System may be further comprised of a tertiary volume selection 2300. In another embodiment, the tertiary volume selection 2300 may be color-coded.

Figure 24:
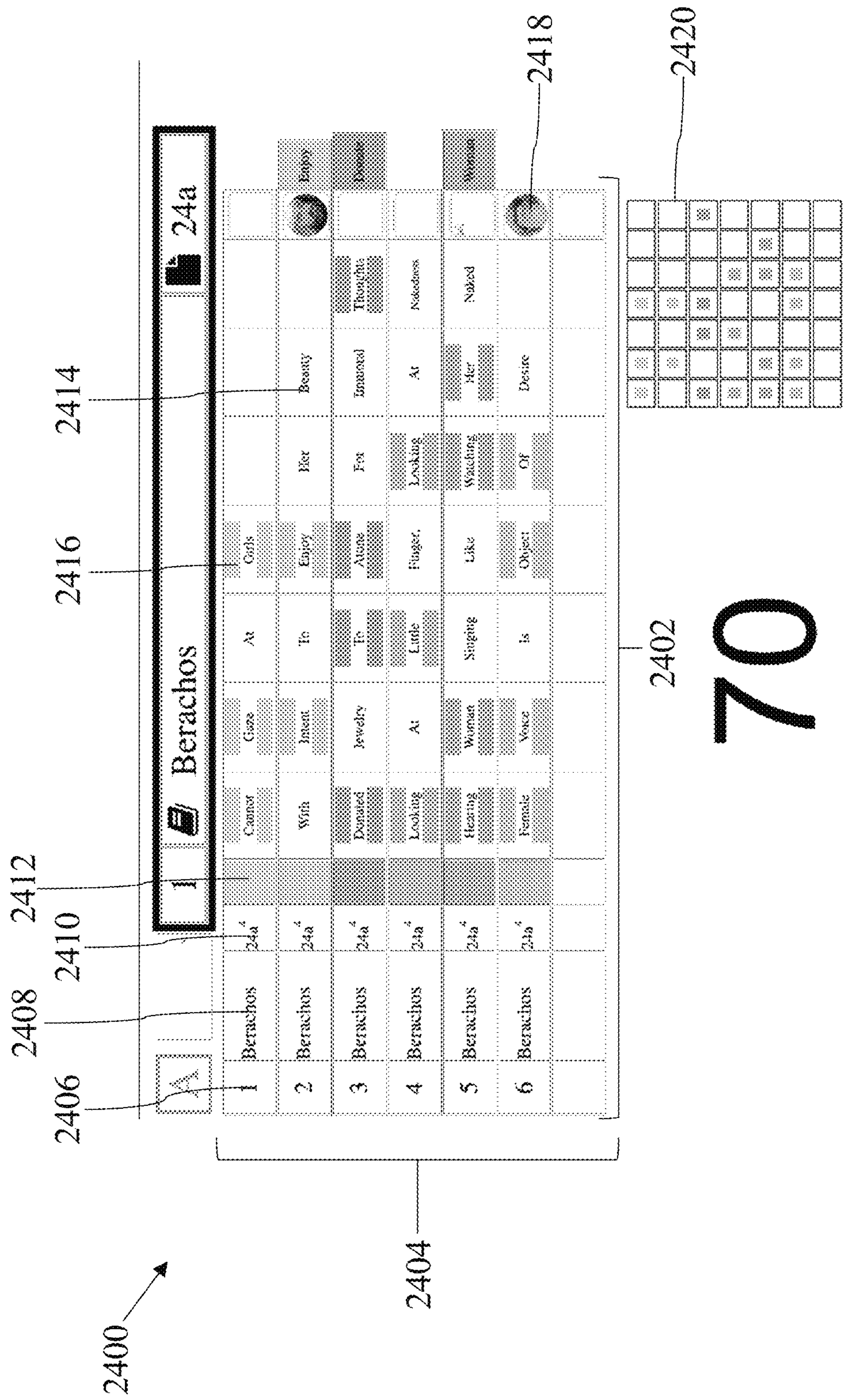
FIG. 24 illustrates an embodiment of a quinary alternate main interface.
Figure 25:
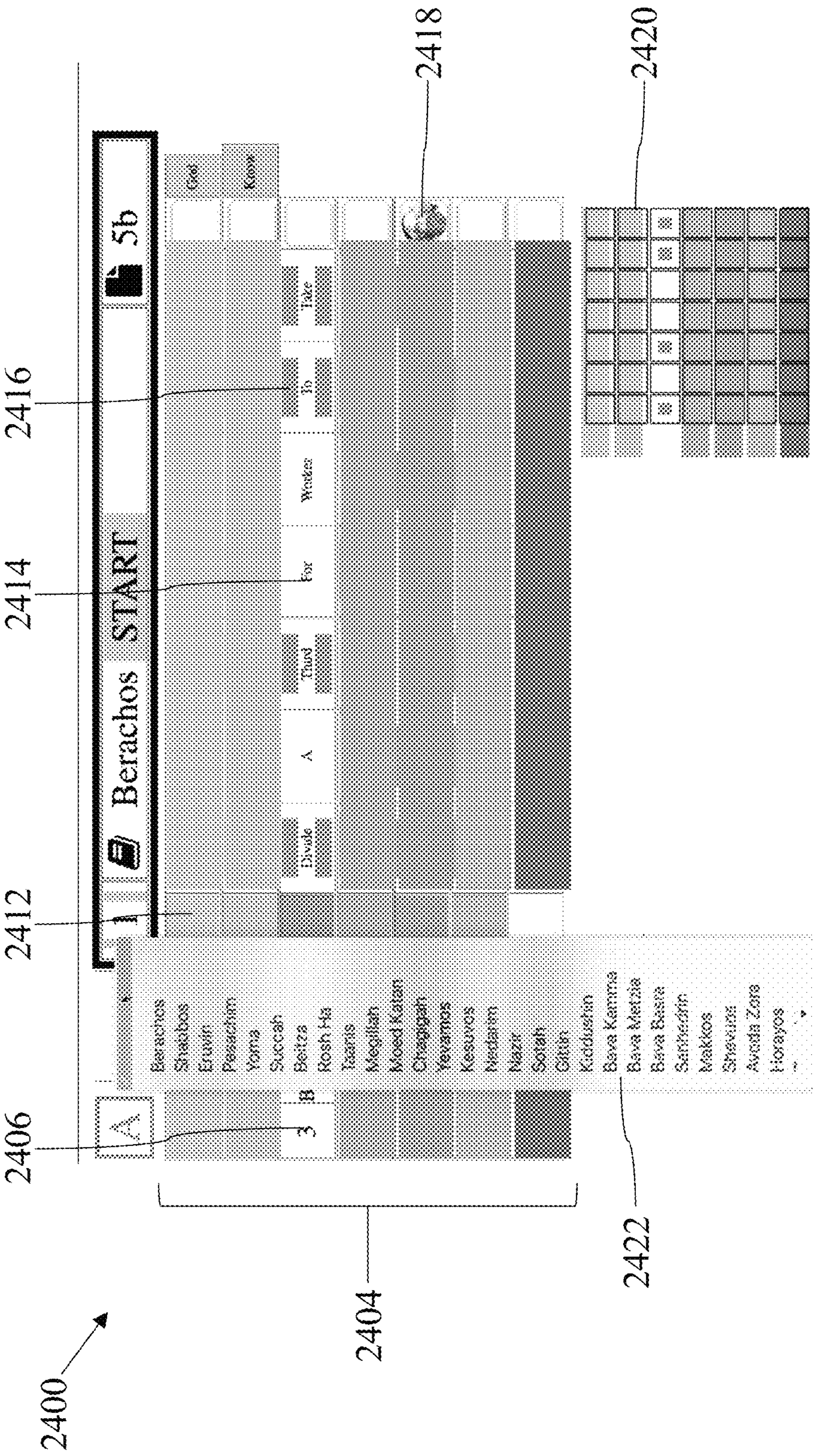
FIG. 25 illustrates an embodiment of the quinary alternate main interface.

Referring to FIGS. 24 and 25, the System may be further comprised of quinary alternate main interface 2400. In an embodiment, the quinary alternate main interface may be comprised of a plurality of columns 2402 and/or a plurality of rows 2404. In a further embodiment, the plurality of columns 2402 may be comprised of twelve columns. In another embodiment, the plurality of rows 2404 may be comprised of seven rows. However, the plurality of columns 2402 and the plurality of rows 2404 may be comprised of any quantity of columns and rows respectively. The intersection of the plurality of columns 2402 and the plurality of rows 2404 may form a grid. Such a grid may be disposed for the organization of alphanumeric characters. In an embodiment, one or more of the plurality of rows 2404, may be covered to display one or more of the plurality of rows 2404.

A first column, comprising the plurality of columns 2402, may be utilized for the organization of a numerical digit 2406. In an embodiment, the numerical digit may be any number. In an alternative embodiment, the numerical digit 2406 may be a number between one and seven.

A second column, comprising the plurality of columns 2402, may be utilized for the organization of one or more books 2408. In an embodiment, the one or more books 2408, may be a section of a written work. As a nonlimiting example, the written work can be a religious text, and the one or more books 2408 may be sections of said religious text (e.g., The written work is the Talmud, and Berachos is a book of the Talmud).

A third column, comprising the plurality of columns 2402, may be utilized for the organization of an alphanumeric code 2410. The alphanumeric code 2410 may direct a user of the quinary alternate main interface 2400 to a page and/or section of the one or more books 2408. In an embodiment, the alphanumeric code 2410 may be comprised of at least one of a number, a letter, and an exponent. In a further embodiment, the number may reflect a page number of the one or more books 2408. In another embodiment, the letter may represent a side of the page of the one or more books 2408. In yet a further embodiment, the exponent may represent a section of the page of the one or more books 2408. As a further nonlimiting example, the alphanumeric code 2410 may have a number of twenty-four, a letter "a," and an exponent of four. In such a nonlimiting example, the twenty-four may represent page twenty-four of the one or more books 2408, comprising the written work. Further, the "a" may represent a first side of page twenty-four of the book 2408. Additionally, the exponent of four may represent a section of the first side of page twenty-four of the one or more books 2408, where a desired text resides.

A fourth column, comprising the plurality of columns 2402, may be utilized for the organization of one or more colors 2412. The one or more colors 2412 may be comprised of any color able to be perceived by the human eye. The one or more colors 2412 may be associated with a particular phonetic sound. As a nonlimiting example, the color yellow might be associated with hard consonant sounds, such as the one's created when a word begins with "c" or "g." In another nonlimiting example, the color grey might be associated with the first consonant sound, while also ignoring any initial vowel sounds. In an embodiment, the one or more colors 2412 may only be comprised of seven colors. As a further nonlimiting example, the seven colors may be comprised of the group yellow, grey, red, blue, green, purple, and brown. In a further embodiment, each of the seven colors may be associated with a different phonetic sound.

A fifth through eleventh column, comprising the plurality of columns 2402, may be utilized for the organization of one or more words 2414. The one or more words may be derived from the written work and/or the one or more books 2408. In an embodiment, the one or more words 2414 may be color-coded, thus forming one or more color-coded words 2416. In a further embodiment, the one or more color-coded words 2416 may be color-coded pursuant to the phonetic sound created at the beginning of said word 2416 when spoken. As a nonlimiting example, words beginning with a hard consonant sound (e.g., "cannot," "gaze," etc.) may be color coded yellow. As a further nonlimiting example, words focused on a first consonant sound (e.g., "M," "N," etc.), while ignoring any initial vowel sounds may be color coded grey.

A twelfth column, comprising the plurality of columns 2402, may be utilized for the organization of one or more historical figures 2418. In an embodiment, the one or more historical figures 2418 may be a rabbi. However, the one or more historical figures 2418 may be comprised of any person from history. In an additional embodiment, the one or more historical figures 2418 of the twelfth column may be associated with the one or more words 2414, in one of the plurality of rows 2404 and the fifth through eleventh columns.

The quinary alternate main interface may be further comprised of a color-coded grid 2420. In an embodiment, the color-coded grid 2420 may display, via the display, the one or more colors 2412 of the one or more color-coded words 2416.

The quinary alternate main interface may be further comprised of a quinary alternate drop-down menu 2422. In an embodiment, the quinary alternate drop-down menu 2422 may be comprised of a list of the one or more books 2408. In an alternate embodiment, the user may be able to select one of the one or more books 2408 from the quinary alternate drop-down menu 2422.

Figure 26:
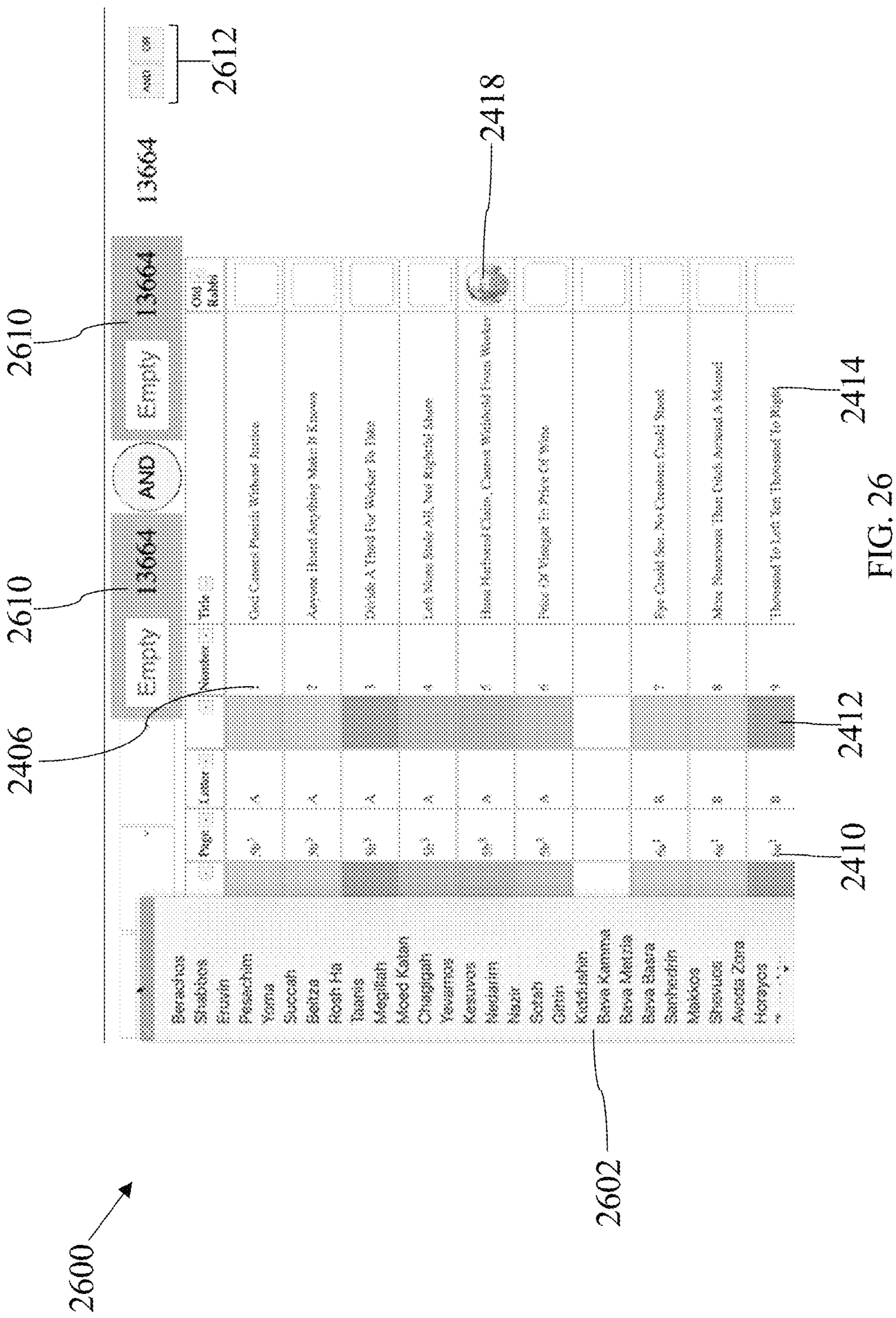
FIG. 26 illustrates an embodiment of a senary alternate main interface.
Figure 27:
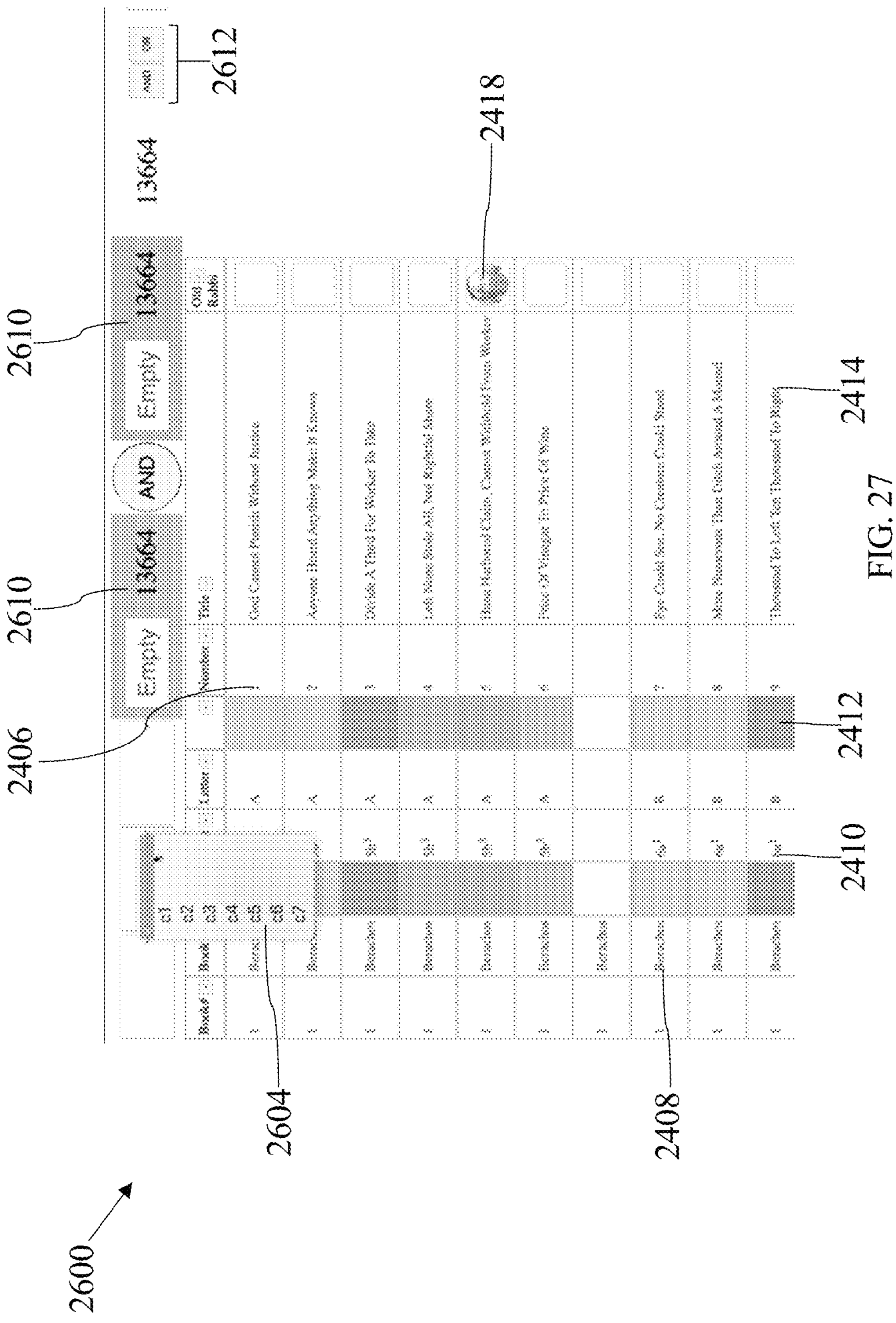
FIG. 27 illustrates an embodiment of the senary alternate main interface.
Figure 28:
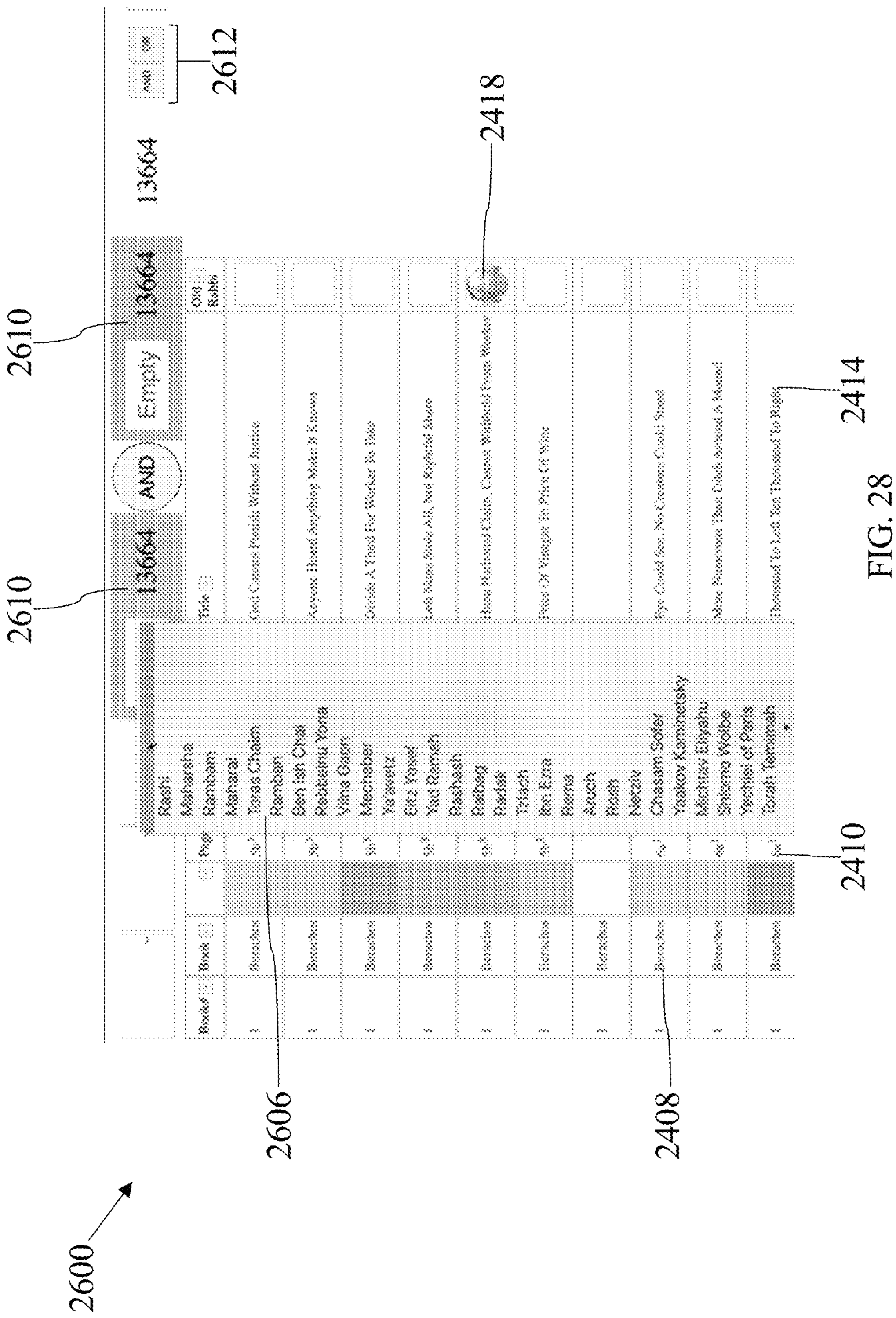
FIG. 28 illustrates an embodiment of the senary alternate main interface.

Referring to FIGS. 26-28 the system may be further comprised of a senary alternate main interface 2600. The senary alternate main interface 2600 may be comprised of at least one of a first senary alternate drop-down menu 2602, a second senary alternate drop-down menu 2604, and a third senary alternate drop-down menu 2606. The senary alternate main interface may be further comprised of a senary alternate grid comprised of one or more columns and/or one or more rows. Such a senary alternate grid, may be utilized to organize at least one of the numerical digit 2406, the one or more books 2408, the alphanumeric code 2410, the one or more colors 2412, the one or more words 2414, the one or more color-coded words 2416, and the one or more historical figures 2418. Additionally, the senary alternate main interface may be comprised of a character-search bar 2610.

The first senary alternate drop-down menu 2602, the second senary alternate drop-down menu 2604, and the third senary alternate drop-down menu 2606 may be comprised of at least one of a list of the one or more books, a list of the one or more colors 2412, and a list of the historical figures 2418. In an embodiment, the user may be able to select one of the one or more books 2408, one of the one or more colors 2412, and/or one of the one or more historical figures 2418 from at least one of the first senary alternate drop-down menu 2602, the second senary alternate drop-down menu 2604, and the third senary alternate drop-down menu 2606.

The senary alternate grid may be utilized for the organization of at least one of the one or more books 2408, the alphanumeric code 2410, the one or more words 2414, the one or more color-coded words 2416, and the one or more historical figures 2418. Further, the character-search bar 2610 may enable the user to search for specific alphanumeric characters. Such a character-search bar 2610, may allow for a Boolean terms and connectors search. In an embodiment, the character-search bar may enable an "and" search and/or an "or" search. In another embodiment the user may be able to toggle between an "and" search and/or an "or" search via the and/or button 2612. The user's search may allow for said user to search the written work for the specific alphanumeric characters.

Figure 29:
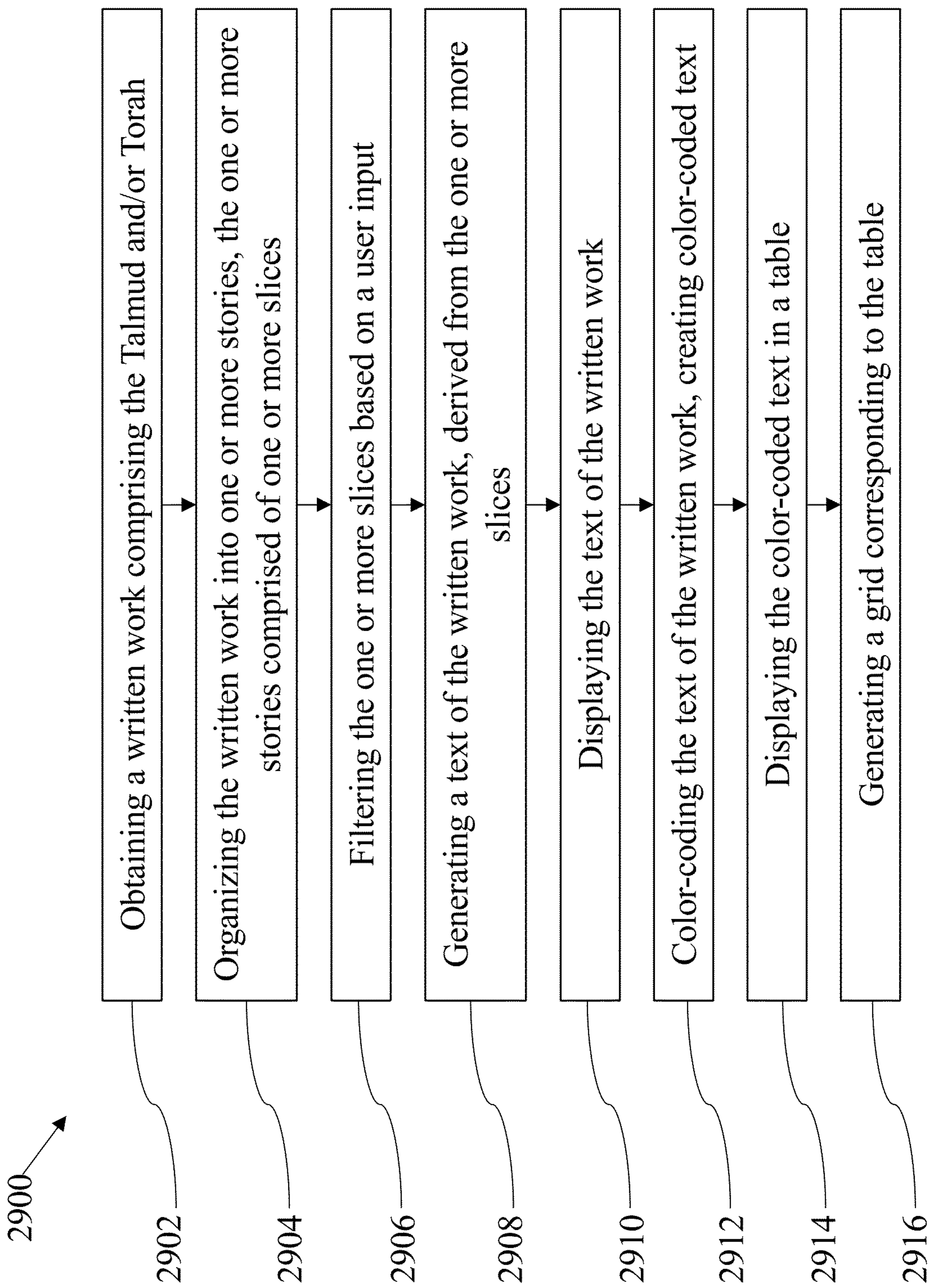
FIG. 29 illustrates an embodiment of a block diagram of a computer implemented method for searching text utilizing categorical touch inputs.

Turning to FIG. 29, the System may be further comprised of computer implemented method 2900. In an embodiment, the computer implemented method (the "method") 2900 may be disposed for searching text utilizing categorical touch inputs. At a first step of the method 2902, a written work may be obtained. In an embodiment, the written work may be a religious text (e.g., the Talmud, the Torah, etc. . . . ). At a second step of the method 2904, the written work may be organized into one or more stories. In an embodiment, the one or more stories may be comprised of one or more slices. At a third step of the method 2906, the one or more slices may be filtered, wherein the filtering may be performed via a user input. In another embodiment, the user input may be comprised of at least one of a plurality of clusters and a manual tag. In a further embodiment, the plurality of clusters may be a theme selected from the group consisting of Culture, Nations, Nature, Religion, NSFW, People, and Spiritual. In yet a further embodiment, the manual tag may be a custom user input. As a nonlimiting example, the custom user input may be any combination of one or more alphanumeric characters. A fourth step of the method 2908 may generate a text of the written work, wherein the text of the written work may be derived from the one or more slices. At a fifth step of the method 2910, the text of the written work may be displayed, via a display. A sixth step of the method 2912 may comprise color-coding the text to create color-coded text. In an embodiment, color-coding the text may comprise one or more steps. Said one or more steps may be (1) determining a phonetic sound at a beginning of one or more words comprising the text of the written work, and (2) assigning a color to the one or more words based on the phonetic sound at the beginning of the one or more words. A seventh step of the method 2914 may display, via the display the color-coded text in a table. Further, an eighth step of the method 2916 may generate a grid comprised of one or more colors, wherein the grid may have an equal number of columns and/or rows as the table. In an embodiment, the one or more colors of the grid may match the color-coded text in the table. In an embodiment, the one or more colors may be at least one of blue, brown, green, grey, purple, red, and yellow.

In an embodiment, the System may be configured to display the content tiles 504, such that said tiles 504 are color coded or otherwise representative of the semantics of the underlying passage, as described above. As is often the case, a user of audiobooks or a reader of texts may have difficulty remembering or discerning the semantic content of the underlying text. This may be especially true in instances where a user does not have sufficient time to orient themselves in the meaning of a passage. Conventional text displaying methods and the hardware support such methods are deficient at supplying the underlying meaning of a passage in a coherent and replicable manner. In an embodiment, the content tiles 504 may be color coded according to the methods contemplated above when the user is reading a particular passage. Thus, the content tiles 504 exhibit an improved system for transmitting and encoding the meaning, a synopsis, or summary of a particular passage. In an embodiment, the System may include a template matrix, wherein the template matrix includes the tiles in an empty configuration. The template matrix may be populated according to the value determined by the system. For example, a value may be a color, wherein the color is associated with a particular soundex category or one of the other categories contemplated above. Thus, the template matrix may include a predetermined number of empty tiles, wherein each of the empty tiles is populated by a value based on a predetermined category mapping (e.g., soundex, theme category, etc.).

In another embodiment, a first device may display the at least one block of text 302, and a second device may display a meaning of the at least one block of text via the content tiles 504. In such an embodiment, the content tiles 504 may be color coded. Further, the System may transmit signals between the first device and the second device, such that the first device is configured to display the at least one block of text, and the second device is configured to display the color coded content tiles, or vice versa. Thus, a first device may operate as a display for text (e.g., unstructured or free text) and the second device may operate as an external display configured to inform a user of the thematic or semantic content of the text.

In a further embodiment, the System may transcribe an audiobook. The System may enable the first device to provide the user with audio derived from an audiobook, and simultaneously transcribe said audio into the color coded content tiles, for example, on the second device. In a nonlimiting example, the user may listen to an audiobook on a smartphone (i.e., the first device), wherein as the user listens to the audiobook, the System transcribes and/or converts the audio into the color coded content tiles on the users smartwatch (i.e., the second device). Traditional devices may be configured to output audio or text, but often fail to output semantic meaning. Meaning, that a user cannot easily determine the semantics or meaning of a particular passage. In an embodiment, the System, by generating a matrix based off of at least one of the at least one block of text 302 and the content tiles 504, may provide an improved technological environment for presenting text without losing the semantic meaning to the user. Furthermore, the utilization of a second device permits the first device to provide an unobstructed or full screen view of the text, while the second device provides supplemental information.

Further, the System may analyze the color coded content tiles for a particular block of text comprising the at least one block of text 302. In an embodiment, the System, via image analysis, may find similar blocks of text comprising the at least one block of text 302. In such an embodiment, the System may analyze, via image analysis, the color coded content tiles and actively generate content tiles 504 and/or at least one block of text 302 similar to the arrangement of the color coded content tiles. As a nonlimiting example, the System may employ a recommendation engine, wherein the System may recommend the user another passage based on the aforementioned image analysis. For example, such a method may utilize a classifier or other machine learning model configured to determine a meaning (e.g., the contextual, thematic, or semantic meaning) of the color coded matrix in order to unearth related passages based on review of each passage's color coded matrix.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer implemented method for searching text utilizing categorical touch inputs, the method comprising:
- obtaining a written work;
- organizing the written work into one or more stories, the one or more stories comprising one or more slices;
- filtering the one or more slices via a user input, the user input comprising at least one of a plurality of clusters and a manual tag;
- generating a text of the written work, the text of the written work derived from the one or more slices;
- displaying, via a display, the text of the written work;
- color-coding the text of the written work creating color-coded text by:
  - determining a phonetic sound at a beginning of each of a plurality of words comprising the text of the written work,
  - assigning a color associated with the phonetic sound to each of the plurality of words,
    - wherein the phonetic sound is selected from one of a plurality of phonetic sounds within a Soundex Value System;
- displaying, via the display, the color-coded text in a table;
- generating a grid comprised of one or more colors, the grid having an equal number of columns and rows as the table, and the one or more colors corresponding to the color-coded text in the table.

2. The computer implemented method of claim 1, wherein the color assigned to each of the plurality of words is selected from the group consisting of blue, brown, green, grey, purple, red, and yellow.

3. The computer implemented method of claim 1, wherein the written work is selected from the group consisting of the Talmud and the Torah.

4. The computer implemented method of claim 1, wherein the plurality of clusters is a theme selected from the group consisting of Culture, Nations, Nature, Religion, NSFW, People, and Spiritual.

5. The computer implemented method of claim 1, wherein the manual tag is comprised of a custom user input.

6. A computer implemented method for searching text utilizing categorical touch inputs, the method comprising:

obtaining a written work, the written work comprising:

the Talmud, and the Torah;

organizing the written work into one or more stories, the one or more stories comprised of one or more slices;

filtering the one or more slices via a user input, the user input comprising at least one of a plurality of clusters and a manual tag, the plurality of clusters being a theme comprised of at least one of Culture, Nations, Nature, Religion, NSFW, People, and Spiritual;

generating a text of the written work, the text of the written work derived from the one or more slices;

displaying, via a display, the text of the written work;

color-coding the text of the written work creating color-coded text by:

determining a phonetic sound at a beginning of each of a plurality of words comprising the text of the written work, assigning a color associated with the phonetic sound to each of the plurality of words, wherein the phonetic sound is selected from one of a plurality of phonetic sounds within a Soundex Value System;

displaying, via the display, the color-coded text in a table;

generating a grid comprised of one or more colors, the grid having an equal number of columns and rows as the table, and the one or more colors corresponding to the color-coded text in the table.

7. The computer implemented method of claim 6, wherein the color assigned to the one or more words is selected from the group consisting of blue, brown, green, grey, purple, red, and yellow.

8. A system for searching text utilizing categorical touch inputs, the system comprising:

a main interface comprising;

a plurality of columns;

a plurality of rows, the plurality of columns and the plurality of rows forming a grid, the grid comprised of at least one of one or more books, an alphanumeric code, one or more colors, one or more words, one or more color-coded words, and one or more historical figures, wherein the one or more color-coded words are created by:

determining a phonetic sound at a beginning of each of the one or more words, assigning a color associated with the phonetic sound to each of the one or more words, wherein the phonetic sound is selected from one of a plurality of phonetic sounds within a Soundex Value System.

9. The system of claim 8, wherein the one or more books is a section derived from a religious written work.

10. The system of claim 8, wherein the alphanumeric code is comprised of:

a number;

a letter; and an exponent.

11. The system of claim 10, wherein the number corresponds to a page of the one or more books.

12. The system of claim 11, wherein the letter corresponds to a side of the page.

13. The system of claim 12, wherein the exponent corresponds to a section of the side of the page.

* * * * *